US012750652B2

(12) United States Patent
Kovács et al.

(10) Patent No.: US 12,750,652 B2
(45) Date of Patent: Sep. 29, 2026

(54) MACHINE LEARNING CONFIGURATION INFORMATION TRANSFER TO UE USING PROXIMITY SERVICES (PROSE)/SIDELINK WIRELESS COMMUNICATION

(71) Applicant: Nokia Technologies Oy, Espoo (FI)

(72) Inventors: István Zsolt Kovács, Aalborg (DK); Nuno Manuel Kiilerich Pratas, Aalborg (DK); Oana-Elena Barbu, Aalborg (DK); Muhammad Majid Butt, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 185 days.

(21) Appl. No.: 18/527,842

(22) Filed: Dec. 4, 2023

(65) Prior Publication Data

US 2024/0196187 A1 Jun. 13, 2024

(30) Foreign Application Priority Data

Dec. 12, 2022 (FI) ...................................... 20226095

(51) Int. Cl.

*H04W 24/02* (2009.01)
*H04W 8/00* (2009.01)
*H04W 8/22* (2009.01)
*H04W 92/18* (2009.01)

(52) U.S. Cl.

CPC ............. *H04W 8/005* (2013.01); *H04W 8/22* (2013.01); *H04W 24/02* (2013.01); *H04W 92/18* (2013.01)

(58) Field of Classification Search

CPC ....... H04W 8/005; H04W 8/22; H04W 24/02; H04W 76/14; H04W 88/04

See application file for complete search history.

(56) References Cited

U.S. PATENT DOCUMENTS

2020/0204961 A1* 6/2020 Diwahar ................. H04W 4/12
2022/0116764 A1 4/2022 Pezeshki et al.
2022/0180251 A1 6/2022 Pezeshki et al.

(Continued)

FOREIGN PATENT DOCUMENTS

WO 2022/060748 A1 3/2022
WO 2022/199951 A1 9/2022
WO 2022/233511 A2 11/2022

OTHER PUBLICATIONS

"3rd Generation Partnership Project; Technical Specification Group Services and System Aspects; Proximity based Services (ProSe) in the 5G System (5GS) (Release 17)", 3GPP TS 23.304, V17.3.0, Jun. 2022, pp. 1-105.

(Continued)

*Primary Examiner* — Sam Bhattacharya
(74) *Attorney, Agent, or Firm* — Barta Jones, PLLC

(57) ABSTRACT

A method includes receiving, by a first user device from a network node, an indication for the first user device to act as a user device-network relay; and, in response to the receiving: carrying out a discovery procedure for determining at least one second user device that is capable of sidelink communications and utilizes machine learning; receiving, by the first user device from the network node, machine learning configuration information; and transmitting, by the first user device to the at least one second user device via sidelink communications, the machine learning configuration information for carrying out a machine learning related operation.

7 Claims, 10 Drawing Sheets

(56) References Cited

U.S. PATENT DOCUMENTS

| | | | | |
|---|---|---|---|---|
| 2022/0237507 A1 | 7/2022 | Bai et al. | | |
| 2023/0184870 A1* | 6/2023 | Shuman | H04W 56/006 | |
| | | | 455/456.1 | |

OTHER PUBLICATIONS

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

"3rd Generation Partnership Project; Technical Specification Group Radio Access Network; E-UTRA and NR; Service Data Adaptation Protocol (SDAP) specification (Release 17)", 3GPP TS 37.324, V17.0.0, Mar. 2022, pp. 1-17.

"New SI: Study on Artificial Intelligence (AI)/Machine Learning (ML) for NR Air Interface", 3GPP TSG RAN Meeting #94e, RP-213599, Agenda: 8.6.1, Qualcomm, Dec. 6-17, 2021, 6 pages.

"Study on Artificial Intelligence (AI)/Machine Learning (ML) for NR Air Interface", 3GPP TSG RAN Meeting #96, RP-221347, Agenda: 9.2.8, Qualcomm, Jun. 6-9, 2022, pp. 1-29.

"New WID on NR sidelink relay enhancements", 3GPP TSG RAN Meeting #94e, RP-213585, Agenda: 8.6.2, LG Electronics, Dec. 6-17, 2021, 6 pages.

"3rd Generation Partnership Project; Technical Specification Group Radio Access Network; Study on NR sidelink relay; (Release 17)", 3GPP TR 38.836, V17.0.0, Mar. 2021, pp. 1-26.

"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.

"3rd Generation Partnership Project; Technical Specification Group Services and System Aspects; Architecture enhancements for 5G System (5GS) to support Vehicle-to-Everything (V2X) services (Release 17)", 3GPP TS 23.287, V17.3.0, Jun. 2022, pp. 1-60.

"3rd Generation Partnership Project; Technical Specification Group Services and System Aspects; Proximity-based services (ProSe); Stage 2 (Release 17)", 3GPP TS 23.303, V17.0.0, Dec. 2021, pp. 1-130.

"Msc-generator", Sourceforge, Retrieved on Mar. 24, 2024, Webpage available at :https://sourceforge.net/projects/msc-generator/.

Office action received for corresponding Finnish Patent Application No. 20226095, dated Apr. 26, 2023, 14 pages.

"3rd Generation Partnership Project; Technical Specification Group Services and System Aspects; Study on system enhancement for Proximity based Services (ProSe) in the 5G System (5GS) (Release 17)", 3GPP TR 23.752, V17.0.0, Mar. 2021, pp. 1-183.

Extended European Search Report received for corresponding European Patent Application No. 23185562.8, dated May 6, 2024, 12 pages.

"3rd Generation Partnership Project; Technical Specification Group Radio Access Network; NR; NR and NG-RAN Overall Description; Stage 2 (Release 17)", 3GPP TS 38.300, V17.2.0, Sep. 2022, pp. 1-210.

"Distributed ML using D2D communication", 3GPP TSG-SA WG1 Meeting #93e, S1-210058, Agenda: 7.4.1, OPPO, Feb. 22-Mar. 4, 2021, 6 pages.

"3rd Generation Partnership Project; Technical Specification Group Services and System Aspects; Study on AI/ML Model Transfer-Phase 2 (Release 19)", 3GPP TR 22.876, V0.2.0, Dec. 2022, pp. 1-21.

* cited by examiner

Example Wireless Network 130

MACHINE LEARNING CONFIGURATION INFORMATION TRANSFER TO UE USING PROXIMITY SERVICES (PROSE)/SIDELINK WIRELESS COMMUNICATION

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IOT) and may offer new types of mission-critical services. For example, ultra-reliable and low-latency communications (URLLC) devices may require high reliability and very low latency.

SUMMARY

A method may include receiving, by a first user device from a network node, an indication for the first user device to act as a user device-network relay; and, in response to the receiving: carrying out a discovery procedure for determining at least one second user device that is capable of sidelink communications and utilizes machine learning; receiving, by the first user device from the network node, machine learning configuration information; and transmitting, by the first user device to the at least one second user device via sidelink communications, the machine learning configuration information for carrying out a machine learning related operation.

A method may include receiving, by a second user device from a first user device, a notification that the first user device has a capability to provide machine learning configuration information via sidelink communications, wherein the second user device utilizes machine learning to perform one or more machine learning related operations; receiving, by the second user device from the first user device via sidelink communications, the machine learning configuration information; and using, by the second user device, the received machine learning configuration information to configure and/or operate a machine learning model at the second user device to carry out a machine learning related operation.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
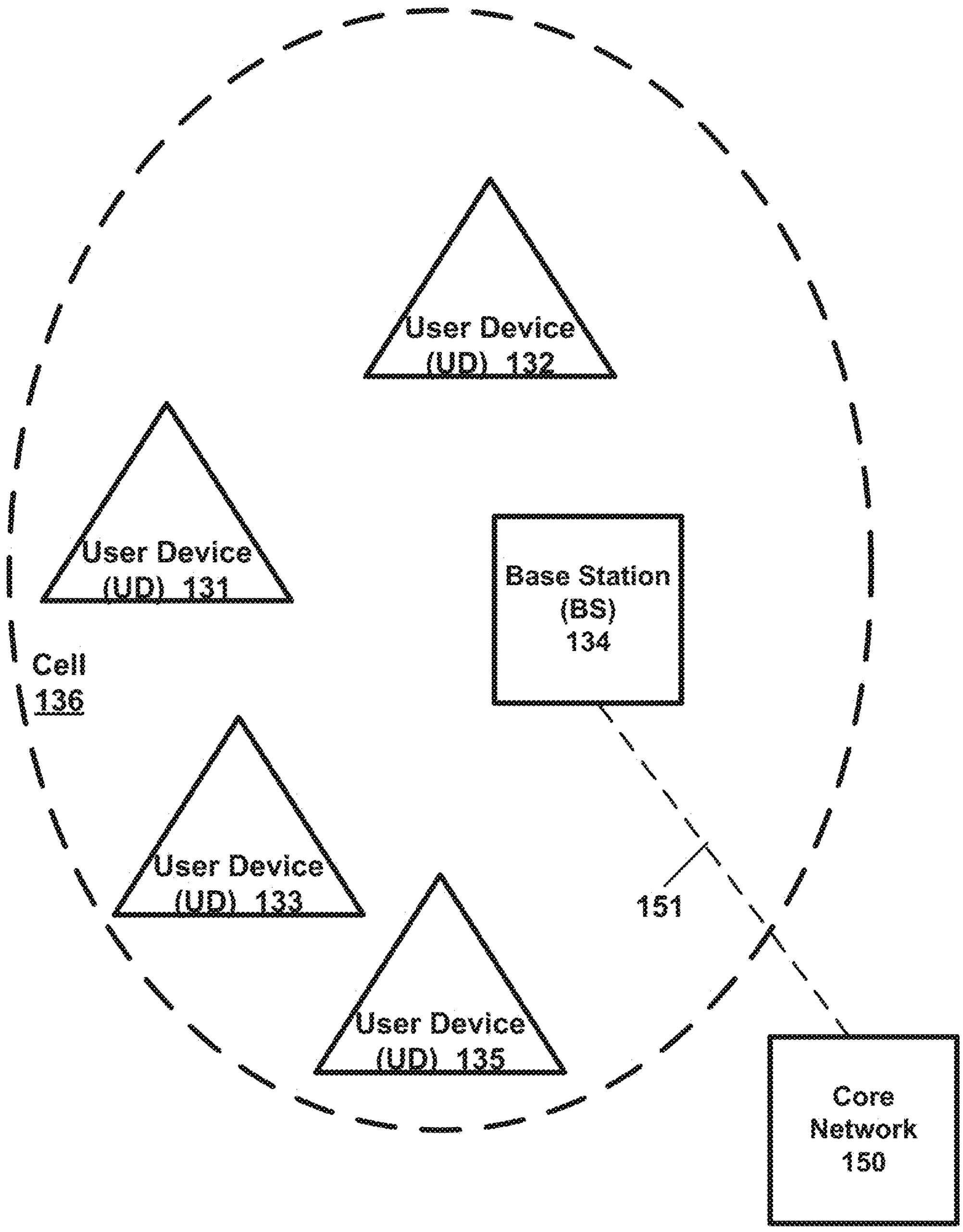
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device or user node (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. Also, a user node may include a user equipment (UE), a user device, a user terminal, a mobile terminal, a mobile station, a mobile node, a subscriber device, a subscriber node, a subscriber terminal, or other user node. For example, a user node may be used for wireless communications with one or more network nodes (e.g., gNB, eNB, BS, AP, CU, DU, CU/DU) and/or with one or more other user nodes, regardless of the technology or radio access technology (RAT). In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IOT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10–5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The techniques described herein may be applied to a wide variety of wireless technologies or wireless networks, such as 5G (New Radio (NR)), cmWave, and/or mmWave band networks, IoT, MTC, eMTC, eMBB, URLLC, 6G, etc., or any other wireless network or wireless technology. These example networks, technologies or data service types are provided only as illustrative examples.

According to an example embodiment, a machine learning (ML) model may be used within a wireless network to perform (or assist with performing) one or more tasks. In general, one or more nodes (e.g., BS, gNB, eNB, RAN node, user node, UE, user device, relay node, or other wireless node) within a wireless network may use or employ a ML model, e.g., such as, for example a neural network model (e.g., which may be referred to as a neural network, an artificial intelligence (AI) neural network, an AI neural network model, an AI model, a machine learning (ML) model or algorithm, a model, or other term) to perform, or assist in performing, one or more ML-enabled tasks. Other types of models may also be used. A ML-enabled task may include tasks that may be performed (or assisted in performing) by a ML model, or a task for which a ML model has been trained to perform or assist in performing).

ML-based algorithms or ML models may be used to perform and/or assist with performing a variety of wireless and/or radio resource management (RRM) functions or tasks to improve network performance, such as, e.g., in the UE for beam prediction (e.g., predicting a best beam or best beam pair based on measured reference signals), antenna panel or beam control, RRM (radio resource measurement) measurements and feedback (channel state information (CSI) feedback), link monitoring, Transmit Power Control (TPC), etc. In some cases, the use of ML models may be used to improve performance of a wireless network in one or more aspects or as measured by one or more performance indicators or performance criteria.

Models (e.g., neural networks or ML models) may be or may include, for example, computational models used in machine learning made up of nodes organized in layers. The nodes are also referred to as artificial neurons, or simply neurons, and perform a function on provided input to produce some output value. A neural network or ML model may typically require a training period to learn the parameters, i.e., weights, used to map the input to a desired output. The mapping occurs via the function. Thus, the weights are weights for the mapping function of the neural network. Each neural network model or ML model may be trained for a particular task.

To provide the output given the input, the neural network model or ML model should be trained, which may involve learning the proper value for a large number of parameters (e.g., weights) for the mapping function. The parameters are also commonly referred to as weights as they are used to weight terms in the mapping function. This training may be an iterative process, with the values of the weights being tweaked over many (e.g., thousands) of rounds of training until arriving at the optimal, or most accurate, values (or weights). In the context of neural networks (neural network models) or ML models, the parameters may be initialized, often with random values, and a training optimizer iteratively updates the parameters (weights) of the neural network to minimize error in the mapping function. In other words, during each round, or step, of iterative training the network updates the values of the parameters so that the values of the parameters eventually converge on the optimal values.

Neural network models or ML models may be trained in either a supervised or unsupervised manner, as examples. In supervised learning, training examples are provided to the neural network model or other machine learning algorithm. A training example includes the inputs and a desired or previously observed output. Training examples are also referred to as labeled data because the input is labeled with the desired or observed output. In the case of a neural network, the network learns the values for the weights used in the mapping function that most often result in the desired output when given the training inputs. In unsupervised training, the neural network model learns to identify a structure or pattern in the provided input. In other words, the model identifies implicit relationships in the data. Unsupervised learning is used in many machine learning problems and typically requires a large set of unlabeled data.

According to an example embodiment, the learning or training of a neural network model or ML model may be classified into (or may include) two broad categories (supervised and unsupervised), depending on whether there is a learning "signal" or "feedback" available to a model. Thus, for example, within the field of machine learning, there may be two main types of learning or training of a model: supervised, and unsupervised. The main difference between the two types is that supervised learning is done using known or prior knowledge of what the output values for certain samples of data should be. Therefore, a goal of supervised learning may be to learn a function that, given a sample of data and desired outputs, best approximates the relationship between input and output observable in the data. Unsupervised learning, on the other hand, does not have labeled outputs, so its goal is to infer the natural structure present within a set of data points.

Supervised learning: The computer is presented with example inputs and their desired outputs, and the goal may be to learn a general rule that maps inputs to outputs. Supervised learning may, for example, be performed in the context of classification, where a computer or learning algorithm attempts to map input to output labels, or regression, where the computer or algorithm may map input(s) to a continuous output(s). Common algorithms in supervised learning may include, e.g., logistic regression, naive Bayes, support vector machines, artificial neural networks, and random forests. In both regression and classification, a goal may include to find specific relationships or structure in the input data that allow us to effectively produce correct output data. As special cases, the input signal can be only partially available, or restricted to special feedback: Semi-supervised learning: the computer is given only an incomplete training signal: a training set with some (often many) of the target outputs missing. Active learning: the computer can only obtain training labels for a limited set of instances (based on a budget), and also may optimize its choice of objects to acquire labels for. When used interactively, these can be presented to the user for labeling. Reinforcement learning: training data (in form of rewards and punishments) is given only as feedback to the program's actions in a dynamic environment, e.g., using live data.

Unsupervised learning: No labels are given to the learning algorithm, leaving it on its own to find structure in its input. Some example tasks within unsupervised learning may include clustering, representation learning, and density estimation. In these cases, the computer or learning algorithm is attempting to learn the inherent structure of the data without using explicitly-provided labels. Some common algorithms include k-means clustering, principal component analysis, and auto-encoders. Since no labels are provided, there may be no specific way to compare model performance in most unsupervised learning methods.

Two UEs may directly communicate via a sidelink (SL) connection (or via SL communications), which may also be referred to as a device-to-device (D2D) connection or a proximity services (ProSe) connection, for example. A SL connection between two (or more) UEs may be used by UEs to communicate with each other, e.g., either instead of a Uu (BS-UE) (e.g., a cellular) connection, or in addition to a Uu (BS-UE) connection. A sidelink (SL) communication may typically involve a direct communication between UEs (e.g., between a transmit UE that is transmitting a signal via a sidelink connection and one or more receive UEs that are receiving the sidelink transmission), and does not require communication via a base station (BS) or gNB. Thus, a sidelink communication may involve a message or information being transmitted between two (or more) SL UEs that are within proximity or within range of each other.

Sidelink (SL) connections (e.g., a sidelink connection directly between UEs) may be used to support a variety of Vehicle-to-everything (V2X) communications or V2X applications or services, or other applications or services. V2X may refer to, for example, the passing of information from a vehicle to any entity that may affect (or be related to) the vehicle, and vice versa, and may include, for example, specific types of communication, such as V2I (Vehicle-to-Infrastructure), V2V (Vehicle-to-vehicle), V2P (Vehicle-to-Pedestrian), V2D (Vehicle-to-device) and V2G (Vehicle-to-grid), etc.

Sidelink connections or sidelink communications may be used to support a variety of sidelink services or V2X services, such as, for example: V2X safety services, V2X non-safety services, and/or other services. According to illustrative example embodiments, a UE may provide, e.g., to one or more other UEs via sidelink connections/communications, a V2X service, including the transmission of data or information for each of one or more V2X services, such as for one or more of, e.g., a platooning service, an advanced driving service, a remote driving service, a remote parking service, a cooperative maneuver service such as lane merge, a cooperative perception service such as a see-through service, etc., or other V2X services. These are merely some illustrative uses or applications for sidelink (SL) communications, and other applications or uses of SL communications may be provided.

Thus, for example, sidelink communications may provide a new or different communication paradigm in which cellular devices are able to communicate directly without relaying their data via the network (without relaying data via a gNB or network node, or RAN network). That means that cars, robots, consumer gadgets and other devices may create their own ad hoc wireless networks without using the radio access network as an intermediary. For instance, sidelink proximity services may allow devices to discover and communicate with one another at extremely high data rates and low latency, making SL communications ideal for peer-to-peer gaming and streaming services as well as enhanced AR (augmented reality), VR (virtual reality) and other wearable device communications. All these new services may require end-to-end solutions, meaning both the network and device characteristics and capabilities should be integrated. In contrast with uplink and downlink, where resource allocation and link adaptation are controlled by the network, in sidelink the device performs both functions autonomously. In other words, the device gains more control of how to use network resources.

Sidelink (SL) communications may also be a candidate for future wireless standards releases as an Industrial IoT enabler. By SL communications restricting the communication link to one hop, latency is typically significantly reduced, which may be important for mission-critical industrial applications. Furthermore, sidelink communications may provide a potential solution for public safety ensuring direct communication or relayed communication between devices.

Another potential use case may include multi-hop relaying where multiple sidelink connections may be used to relay information from device to device to achieve better power consumption, overcome link budget constraints, and enhance latency and reliability. Gaming and entertainment services with AR/VR can also take advantage of sidelink, as will body networks, using direct 5G connections to replace the Bluetooth and eventually Wi-Fi links that currently connect these devices. The result may be a revolutionary change in the communication architecture for many consumer devices. Instead of providing a different radio interface for every use case, device vendors could rely solely on 5G as the link for wide-area, local-area and personal-area communications.

Proximity services (or sidelink communications services) may include two main elements: network assisted discovery of user devices (UEs) with a desire to communicate with UEs which are in close physical proximity and the facilitation of direct communication between such UEs with, or without, supervision from the network. Direct communication means a radio connection is established between the users' mobiles without transiting via the network.

A UE may act as a UE to network relay, where one UE acts as a relay for another UE(s) and provides access to network services outside the normal network coverage area. Similarly, a UE may act or operate as a UE to UE relay where one UE acts as a relay point between two other UEs and allows communication to take place without transiting via the network even if the communicating UEs are out of range for direct communication.

In a typical situation, a UE may receive machine learning (ML) configuration information (e.g., any information related to a ML model or ML configuration, such as information providing, identifying or relating to a ML model or ML configuration, ML model parameters and/or weights, conditions or settings under which the ML model may or should be used, information identifying a ML-enabled function (which may also be referred to as a ML-enabled feature) for which the ML model or parameters are provided, ML model assistance information, or other ML model or ML configuration related information) from a network node (e.g., from a gNB, a CU/DU, or other network node that is serving the UE). For example, a ML configuration or ML configuration information may include, e.g., a ML model configuration or any information related to a ML model configuration, e.g., such as ML model parameters or weights, conditions or settings under which the ML model may or should be used, or other ML configuration information. In many cases, a network node or gNB may need to provide a same ML configuration information to multiple or many UEs, which may create significant overhead for the gNB, e.g., consuming significant hardware resources, time resources, and/or other resources of the gNB to provide or communicate such ML configuration information to many UEs. Furthermore, some UEs (e.g., which may be referred to as out of coverage UEs) may not be connected to (or served by) a gNB or network node, which may prevent such UEs from receiving ML configuration information from a network node or gNB. In some cases, connectivity to a gNB may still be available for an out of coverage UE via a relay UE and/or via sidelink communications. Thus, as shown and described hereinbelow with respect to FIGS. 2-10, it may be advantageous for sidelink (SL) communications (or proximity services) to be used to allow a relay UE to 1) receive machine learning (ML) configuration information from a network node (e.g., a gNB) and then 2) relay or provide this received ML configuration information to one or more other UEs.

Figure 2:
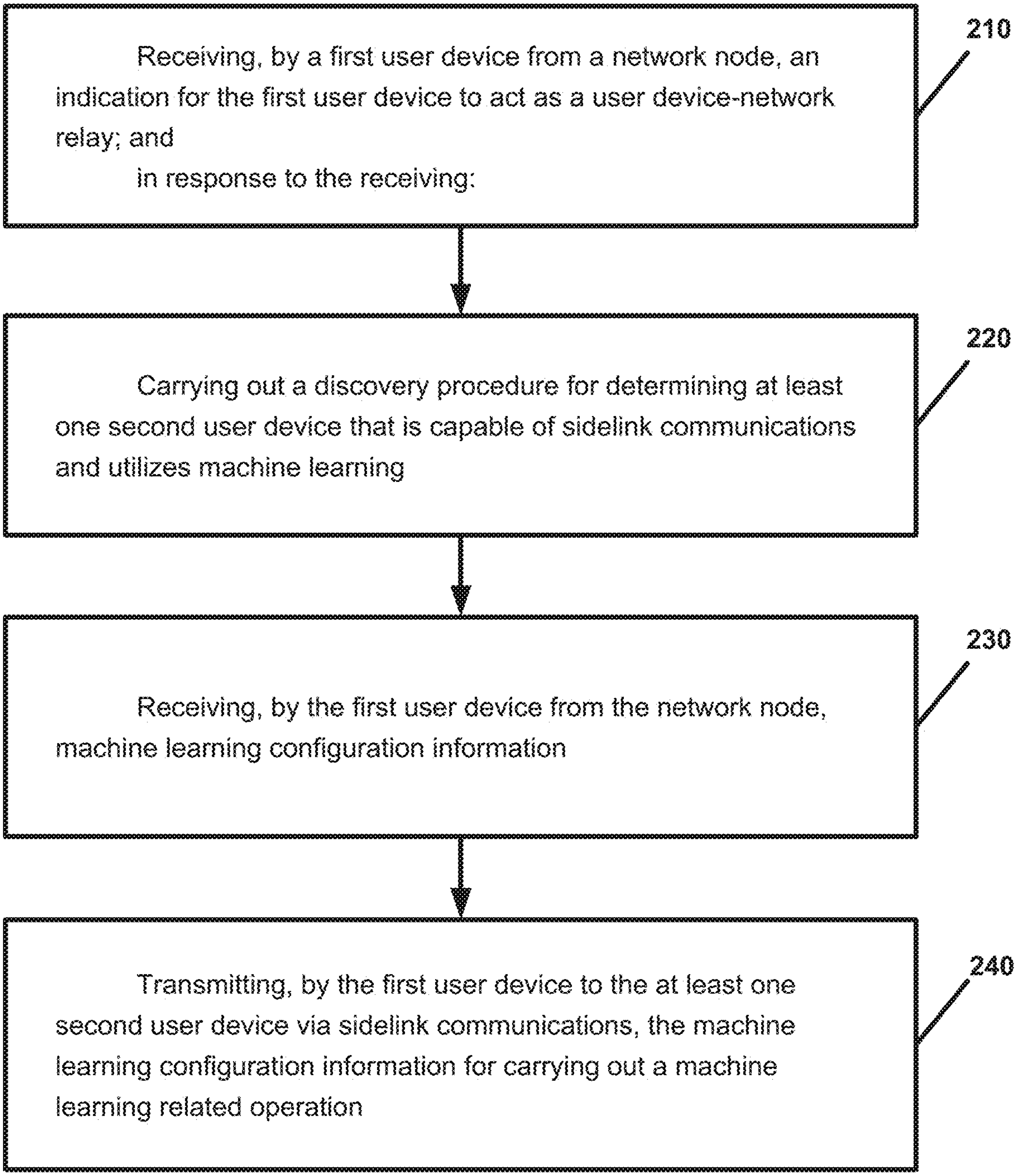
FIG. 2 is a flow chart illustrating operation of a first user device or UE that operates to relay machine learning configuration information from a network node to at least one second user device or UE.

FIG. 2 is a flow chart illustrating operation of a first user device or UE that operates to relay machine learning configuration information from a network node to at least one second user device or UE. Thus, the first user device or first UE, which operates as a relay UE to relay machine learning (ML) configuration information from a network node to other UEs, may be or may be referred to as a relay UE, a network-to-UE relay, a UE-to-network relay, and/or a UE-network relay (since the relay UE may relay information one or both directions between the network (e.g., gNB) and other UEs), a proximity-services relay, and/or a sidelink (SL) service relay (e.g., since the relay of information by relay UE to and/or from other UEs may be performed by relay UE via sidelink communications or proximity services). Operation 210 includes receiving, by a first user device from a network node, an indication for the first user device to act as a user device-network relay (e.g., an indication for the first user device or first UE to operate as a relay UE to relay information, such as ML configuration information, from the network node (or gNB) and one or more other UEs). And in response to the receiving, performing the following: Operation 220 includes carrying out a discovery procedure for determining at least one second user device that is capable of sidelink communications and utilizes machine learning. Operation 230 includes receiving, by the first user device from the network node, machine learning configuration information. Operation 240 includes transmitting, by the first user device to the at least one second user device via sidelink communications, the machine learning configuration information for carrying out a machine learning related operation (e.g., such as for carrying out or performing a machine learning-enabled function). For example, the first user device may be in proximity to the at least one second user device, e.g., to allow the first user device to communicate with the at least one second user device via sidelink communication (or proximity services).

With respect to the method of FIG. 2, the method may further include: prior to the transmitting, modifying, by the first user device, the machine learning configuration information.

With respect to the method of FIG. 2, the modifying the machine learning configuration information may be performed by the user device based on an indication received by the user device from the network node (e.g., an indication, a signal, and/or a configuration may be sent by network node to the first user device to instruct or cause (and/or configure) the first user device to modify the machine learning configuration information, and then the first user device may transmit or provide the modified machine learning configuration information to the at least one second user device.

With respect to the method of FIG. 2, the carrying out the discovery procedure for determining at least one second user device that is capable of sidelink communications and utilizes machine learning may include (or may further include) carrying out a discovery procedure for determining at least one second user device in proximity of the first user device that is capable of using or performing a ML-enabled function for which (or based upon) the machine learning configuration information is transmitted or provided (or will be transmitted or provided) by the first user device to the at least one second user device.

With respect to the method of FIG. 2, the method may further include notifying, by the first user device, the at least one second user device that the first user device has a capability to provide machine learning configuration information via sidelink communications.

With respect to the method of FIG. 2, the notifying may include at least one of the following: transmitting, by the first user device, an announcement message indicating that the first user device has a capability to provide or relay machine learning configuration information via sidelink communications to other user devices; or performing the following: receiving, by the first user device from the at least one second user device, a solicitation message requesting information as to relay capabilities of the first user device; and transmitting, by the first user device to the at least one second user device, a response message indicating that the first user device has the capability to provide machine learning configuration information via sidelink communications to the at least one second user device. Also, with respect to the method of FIG. 2, the announcement message may include a user device to network relay discovery announcement message; the solicitation message may include a user device to network relay discovery solicitation message; and/or the response message may include a user device to network relay discovery response message.

With respect to the method of FIG. 2, the transmitting the machine learning configuration information may include at least one of the following: transmitting, by the first user device to the at least one second user device via sidelink communications, the machine learning configuration information via unicast communications; or transmitting, by the first user device to the at least one second user device via sidelink communications, the machine learning configuration information via groupcast or broadcast communications.

With respect to the method of FIG. 2, the transmitting the machine learning configuration information may include: determining whether a number of user devices within an area or a user device density is greater than a threshold; transmitting, by the first user device to the at least one second user device via sidelink communications, the machine learning configuration information via unicast communications if the number of the other user devices within an area or the user device density is not greater than the threshold; and transmitting, by the first user device to the at least one second user device via sidelink communications, the machine learning configuration information via groupcast or broadcast communications if the number of the other user devices within an area or the user device density is greater than the threshold.

With respect to the method of FIG. 2, the machine learning configuration information that is transmitted to the at least one second user device via sidelink communications may include at least one of the following: a plurality of weights, bias values, activation functions, convolution parameters, dropout rates, hyperparameters to be used to configure a ML model for training and/or inference, configuration parameters for the input data pre-processing and output inference post-processing of the ML model, a potential configuration for the non-ML (rule-based) algorithm which may be used as a fall-back mode for the ML-based algorithm or ML-enabled function, and/or other parameters of that may be related to a machine learning configuration or a machine learning model; a machine learning-enabled feature identifier that identifies for which function, of a plurality of machine learning-enabled functions, the machine learning configuration information is being provided; one or more conditions for the at least one second user device that receives the machine learning configuration information to determine a state of the at least one second user device as either served by a network node or not served by a network node; one or more machine learning-enabled function parameters to be used by the at least one second user device if the at least one second user device is in a state of served by a network node; and/or one or more machine learning-enabled function parameters to be used by the at least one second user device if the at least one second user device is in a state of not served by a network node.

As noted, in some cases, the first user device may modify the machine learning configuration information prior to transmitting the (e.g., modified) machine learning configuration information to the at least one second user device. For example, the first user device may modify the received machine learning configuration information received from the network node, and then the first user device may transmit the modified machine learning configuration information to the at least one second user device. Modifying the machine learning configuration information may include, e.g., modifying, adjusting, changing, altering or updating any aspect or portion of the machine learning configuration information. For example, modifying the machine learning configuration information may include, e.g., one or more of: modifying one or more of the plurality of weights and/or parameters, bias values, activation functions, convolution parameters, dropout rates, hyperparameters used to configure a machine learning model for training and/or inference of a machine learning model or the machine learning configuration information; modifying one or more the configuration parameters for input data pre-processing and output inference post-processing of the machine learning model or the machine learning configuration information; modifying the configuration for the non-machine learning algorithm that may be used as a fall-back mode for the machine learning-based algorithm or machine learning-enabled function; adjusting the validity of the machine learning configuration information, e.g., such as adjusting how long (or time period) the new machine learning configuration information is valid with respect to reception time at the second user device; adjusting (e.g., simplifying or decreasing number of inputs or other parameters) the machine learning configuration information, such as by removing layers, shortening or decreasing input size, etc.

With respect to the method of FIG. 2, the one or more conditions for the at least one second user device that receives the machine learning configuration information to determine a state of the at least one second user device as either served by the network node or not served by the network node comprises at least one of: an initial value of a first timer to be used by the at least one second user device to determine if the at least one second user device is in a state of not served by a network node; an initial value of a second timer to be used by the at least one second user device to determine when the second user device is in a state of served by a network node.

With respect to the method of FIG. 2, the one or more machine learning-enabled function parameters to be used by the at least one second user device if the at least one second user device is in a state of served by a network node comprise one or more parameters that instruct the at least one second user device to operate in a first indicated mode of at least one of an inference mode, a training mode, and/or an off mode for the machine learning model when the at least one second user device is in a state of served by the network node; and/or the one or more machine learning-enabled function parameters to be used by the at least one second user device if the at least one second user device is in a state of not served by a network node comprise one or more parameters that instruct the at least one second user device to operate in a second indicated mode of at least one of an inference mode, a training mode, and/or an off mode for the machine learning model when the at least one second user device is in a state of not served by a network node, wherein the second indicated mode is different than the first indicated mode.

With respect to the method of FIG. 2, the one or more machine learning-enabled function parameters to be used by the at least one second user device if the at least one second user device is in a state of served by a network node comprise one or more parameters that instruct the at least one second user device to operate in an inference mode for the machine learning model when the at least one second user device is in a state of served by a network node; and/or the one or more machine learning-enabled function parameters to be used by the at least one second user device if the at least one second user device is in a state of not served by a network node comprise one or more parameters that instruct the at least one second user device to operate in at least one of a training mode or an off mode for the machine learning model when the at least one second user device is in a state of not served by a network node.

Figure 3:
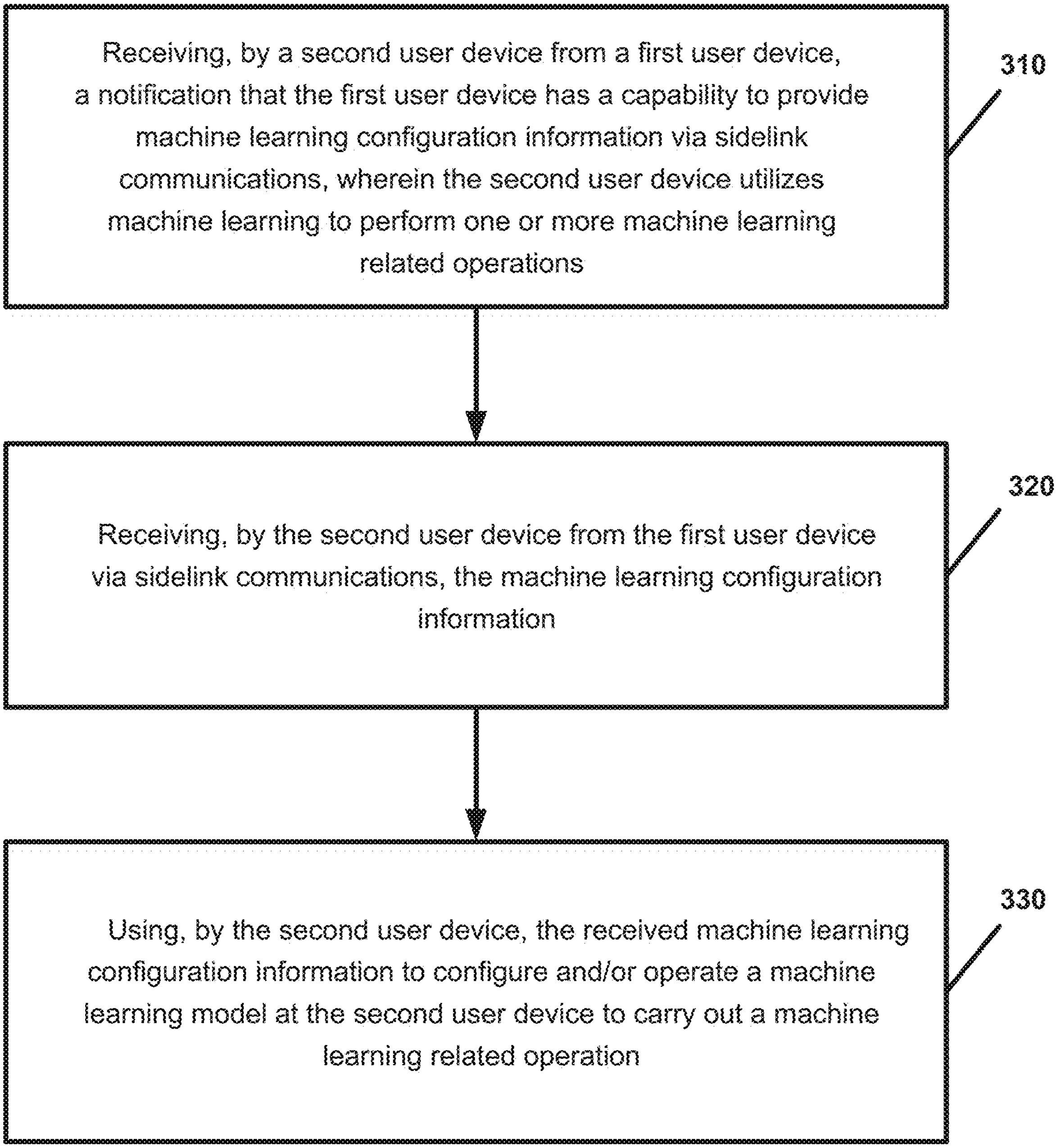
FIG. 3 is a flow chart illustrating operation of a user device or UE that receives machine learning configuration information from another UE.

FIG. 3 is a flow chart illustrating operation of a user device or UE that receives machine learning configuration information from another UE. Operation 310 includes receiving, by a second user device from a first user device, a notification that the first user device has a capability to provide machine learning configuration information via sidelink communications, wherein the second user device utilizes machine learning to perform one or more machine learning related operations. Operation 320 includes receiving, by the second user device from the first user device via sidelink communications, the machine learning configuration information. And, operation 330 includes using, by the second user device, the received machine learning configuration information to configure and/or operate a machine learning model at the second user device to carry out a machine learning related operation. For example, the first user device may be in proximity to the at least one second user device, e.g., to allow the first user device to communicate with the at least one second user device via sidelink communication (or proximity services).

With respect to the method of FIG. 3, the receiving a notification may include at least one of: receiving, by the second user device, an announcement message indicating that the first user device has a capability to provide or relay machine learning configuration information via sidelink communications to the second user device; or performing the following: transmitting, by the second user device to the first user device, a solicitation message requesting information as to relay capabilities of the first user device; and receiving, by the second user device from the first user device, a response message indicating that the first user device has the capability to provide machine learning configuration information via sidelink communications to the at least one second user device. Also, with respect to the method of FIG. 3, the announcement message may include a user device to network relay discovery announcement message; the solicitation message may include a user device to network relay discovery solicitation message; or the response message comprises a user device to network relay discovery response message.

With respect to the method of FIG. 3, the receiving the machine learning configuration information may include at least one of the following: receiving, by the second user device from the first user device via sidelink communications, the machine learning configuration information via unicast communications; or receiving, by the second user device from the first user device via sidelink communications, the machine learning configuration information via groupcast or broadcast communications.

With respect to the method of FIG. 3, the machine learning configuration information may include at least one of the following: a plurality of weights, bias values, activation functions, convolution parameters, dropout rates, hyper-parameters to be used to configure a ML model for training and/or inference, configuration parameters for the input data pre-processing and output inference post-processing of the ML mode, a potential configuration for the non-ML (rule-based) algorithm which may be used as a fall-back mode for the ML-based algorithm or ML-enabled function, and/or other parameters of that may be related to a machine learning configuration or a machine learning model; a machine learning-enabled feature identifier that identifies for which function, of a plurality of machine learning-enabled functions, the machine learning configuration information is being provided; one or more conditions for the at least one second user device that receives the machine learning configuration information to determine a state of the at least one second user device as either served by a network node or not served by a network node; one or more machine learning-enabled function parameters to be used by the at least one second user device if the at least one second user device is in a state of served by a network node; and/or one or more machine learning-enabled function parameters to be used by the at least one second user device if the at least one second user device is in a state of not served by a network node. With respect to the method of FIG. 3, the one or more conditions for the second user device that receives the machine learning configuration information to determine a state of the second user device as either served by the network node or not served by the network node may include at least one of: an initial value of a first timer to be used by the second user device to determine if the second user device is in a state of not served by a network node; an initial value of a second timer to be used by the second user device to determine when the second user device is in a state of served by a network node.

With respect to the method of FIG. 3, the one or more machine learning-enabled function parameters to be used by the second user device if the second user device is in a state of served by a network node may include one or more parameters that instruct the second user device to operate in a first indicated mode of at least one of an inference mode, a training mode, and/or an off mode for the machine learning model when the second user device is in a state of served by the network node; and/or the one or more machine learning-enabled function parameters to be used by the second user device if the second user device is in a state of not served by a network node may include one or more parameters that instruct the second user device to operate in a second indicated mode of at least one of an inference mode, a training mode, and/or an off mode for the machine learning model when the at least one second user device is in a state of not served by a network node, wherein the second indicated mode is different than the first indicated mode.

With respect to the method of FIG. 3, the one or more machine learning-enabled function parameters to be used by the second user device if the at least one second user device is in a state of served by a network node may include one or more parameters that instruct the second user device to operate in an inference mode for the machine learning model when the second user device is in a state of served by a network node; and/or the one or more machine learning-enabled function parameters to be used by the second user device if the second user device is in a state of not served by a network node may include one or more parameters that instruct the second user device to operate in at least one of a training mode or an off mode for the machine learning model when the second user device is in a state of not served by a network node.

The text or description hereinbelow and FIGS. 4-10 provide further details for or with respect to the methods described for FIGS. 2-3.

The network (NW) is likely to benefit from ML solutions in a case where a large number of UEs support ML-enabled functionalities. Not all UEs are assumed to use ML-enabled functions simultaneously (IDLE/INACTIVE vs CONNECTED mode, etc.). Some UEs may be in 'ML training' mode while other UEs may be in 'ML inference' mode in which the ML model is used to generate outputs.

Proper UE-assisted ML operation may, at least in some cases, require several (re)configurations from the network (model activation/deactivation, model tuning/transfer, etc.) and (re)configuring a large number of UEs may consume a significant number of resources, e.g., consume a significant number of resources, such as signaling resources (e.g., RRC (radio resource control) signaling, MAC signaling, hardware resources, etc. Such a signaling overload situation at the gNB applies to both collaboration Level y (signaling-based collaboration without model transfer) and Level z (signaling-based collaboration with model transfer). The current approach where gNB conveys ML configuration to each of many UEs is inefficient, and may overload the gNB and/or may cause excessive signaling overhead for the gNB. Therefore, at least in some cases, it may be more efficient for UEs to relay or send ML configuration via SL to other UEs, e.g., in order to reduce gNB signaling overhead. Also, fewer spectral resources may be required since in some cases, UEs may be closer to each other than to the gNB, e.g., so UE may need lower power for transmission of ML configuration than if transmitted from the gNB. UE to UE (e.g., sidelink or ProSe) communications may also be faster than from gNB. The UE (e.g., the first UE acting as a relay UE) may forward the ML configuration information it receives from the gNB. Or, the UE (first UE acting as a relay UE) may first adjust one or more aspects (e.g., weights, or other parameters) of the ML configuration information, and then may forward such adjusted or modified ML configuration to one or more second UEs that are within proximity of the first UE.

Therefore, as shown and described with respect to FIGS. 1-10, techniques are described in which a UE (e.g., a first UE, which may operate as a relay UE) may determine or may receive an indication from a network node (e.g., gNB) that the first UE is to act or function as a proximity-service (or SL service) relay from the network node to at least one second UE of machine learning configuration information. The first UE may perform a discovery procedure to determine at least one second UE that is in proximity to the first UE and is capable of sidelink (or ProSe) communications and utilizes machine learning for one or more machine learning operations. Similarly, the at least one second UE (which will be receiving the relayed machine learning configuration information via SL communications from the first UE) receives a notification from the first UE that the first UE has a capability to provide machine learning (ML) configuration information via SL communications. The first UE (e.g., operating as a relay UE) receives a machine learning configuration information from the gNB. The first UE (e.g., the relay UE) transmits the ML configuration information to the at least one second UE via sidelink or ProSe (or device-to-device, or UE-to-UE) communications. The at least one second UE then may use the received ML configuration information to configure (e.g., to configure a ML model for training mode and/or to be used in inference mode) and/or operate (e.g., operate the configured ML model in inference mode) a ML model (e.g., provided or located at the second UE) to carry out or perform a machine learning related operation.

Figure 4:
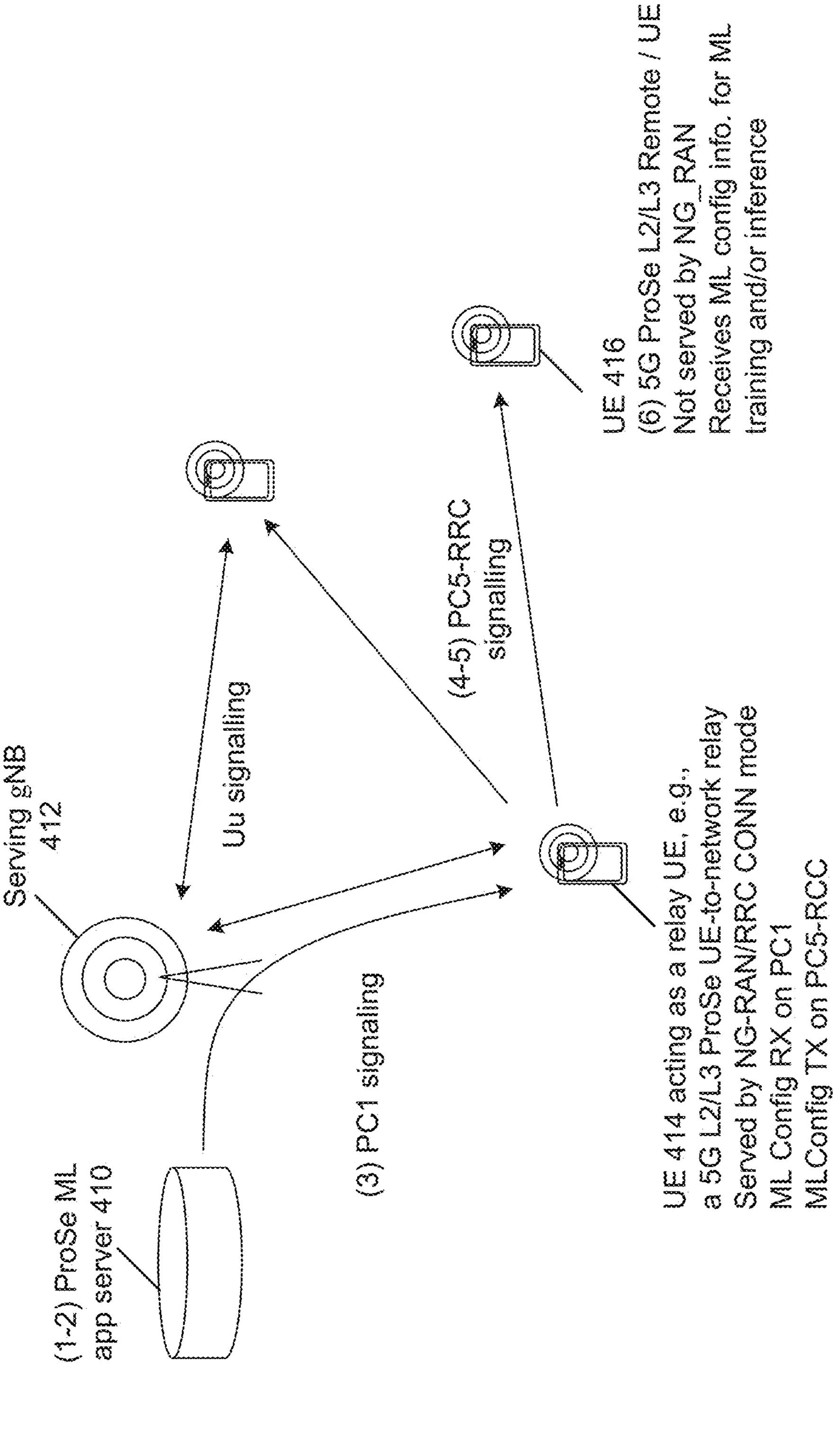
FIG. 4 is a diagram illustrating relay of machine learning (ML) configuration information by a relay UE to one or more other UEs.

FIG. 4 is a diagram illustrating relay of machine learning (ML) configuration information by a relay UE to one or more other UEs. Additional information elements (IEs) may be provided or included within sidelink (SL) (ProSe) messages or functions to allow a UE that is acting as a relay UE to forward or transmit machine learning (ML) configuration information to one or more other UEs. As shown in FIG. 4, a UE 414 (acting as a relay UE) may be connected or and/or served by a serving gNB 412. A ProSe (or sidelink) application server 410 may also be provided within the network, at a gNB, on a cloud server, or provided at another location. Other UEs may also be provided, including a UE 416, e.g., which may be remote and/or not connected to serving gNB 412, for example.

As shown in FIG. 4, at 1) the ProSe ML Application server 410, which may have access to all the ML configurations used by UEs, various options, access to training of UE ML models, and//or may have access to various possible ML configurations), generates ProSe (or sidelink) ML configuration information.

At 2) ProSe ML App. Server 410 selects a group of target UEs spread across the RAN (radio access network) to offer the ProSe MLConfig (machine learning configuration) service. One or more of these selected UEs may also act or take the role of UE-to-Network Relay to relay ML configuration information from the network to one or more other UEs.

At 3) of FIG. 4, ProSe ML App. server 410 selects UE 414 as a relay UE (e.g., to operate as a UE-to-Network Relay and/or network-to-UE relay) and the ProSe app server 410 transmits or provides the MLConfig (machine learning configuration) information to UE 414 (the UE selected as relay UE) via PC1 signaling, for example. Thus, App. Server 410 selects one of the UEs to be a relay UE (in this case, UE 414 is selected as a relay UE to relay ML configuration information from the network to other UEs within proximity of the UE 414).

At 4) of FIG. 4, UE 414 (relay UE) announces (or indicates upon discovery request) to its potential remote UEs that it can offer Prose (or sidelink) MLConfig service (e.g., UE 414 indicates to other UEs that it can provide or transmit ML configuration information via ProSe or SL communications).

At 5) of FIG. 4, the UE 414 (relay UE) transmits the MLConfig (ML configuration information received from the network or from ProSe ML app server 410) to one or more other UEs, e.g., such as to one or more remote UEs, such as to UE 416 via PC5-RRC signaling (UE-to-UE signaling): For example, when the density of remote UEs requiring the ProSe MLConfig service is below a network configured threshold, the selected UE 414 (acting as relay UE) can transmit the Prose MLConfig in a unicast manner during the PC5 RRC exchanges to other UEs. Unicast SL communication to convey ML configuration information. On the other hand, when the density of remote UEs is above a network configured threshold, the selected UE 414 (acting as a relay UE) can transmit the Prose MLConfig in a groupcast manner to a groupcast ID associated Prose MLConfig service, e.g., the relay UE may groupcast or broadcast this ML configuration information to UEs when the number of UEs or density of UEs is above the threshold. The gNB or the network may instruct the relay UE (e.g., UE 414) the way (unicast or broadcast) in which the relay UE may convey this ML configuration information to other UEs. The groupcast ID associated with the Prose MLConfig can be part of the network (NW) configuration or pre-configuration of the remote UE. This group (or groupcast ID assigned for this purpose of relaying ML configuration information via SL or ProSe communications to other UEs) may be configured to be open (e.g., it does not require group management functions to add or remove members to the group). Also, for example, the radio bearers used to exchange Prose MLConfig may be either unencrypted or apply group specific encryption. In this mode (broadcast or groupcast communication of ML configuration information), only the UEs selected by the network may be allowed to perform the groupcast transmission. Non-selected UEs can only take the role of ML configuration information receiver in this groupcast group.

At 6), after receiving the machine learning configuration information from the relay UE (UE 414), the other UEs, such as UE 416 (and possibly other target UEs) may then apply the provided ML configuration information (e.g., which may include a ML configuration and/or ML model weights or parameters or other ML related information) provided in the ProSe MLConfig, to their ML models, e.g., depending on the indicated condition(s). PC1 signaling may be used by ProSe ML app. server 410 to send or transmit the ML configuration information to the relay UE (UE 414) via gNB 412. Thus, gNB 412 may act as a relay between the ProSe ML application server 410 and the relay UE 414, e.g., to forward the ML configuration information from ProSe ML app. Server 410 to the relay UE (UE 414). PC5 signaling is UE to UE and can be unicast or broadcast signaling.

Figure 5:
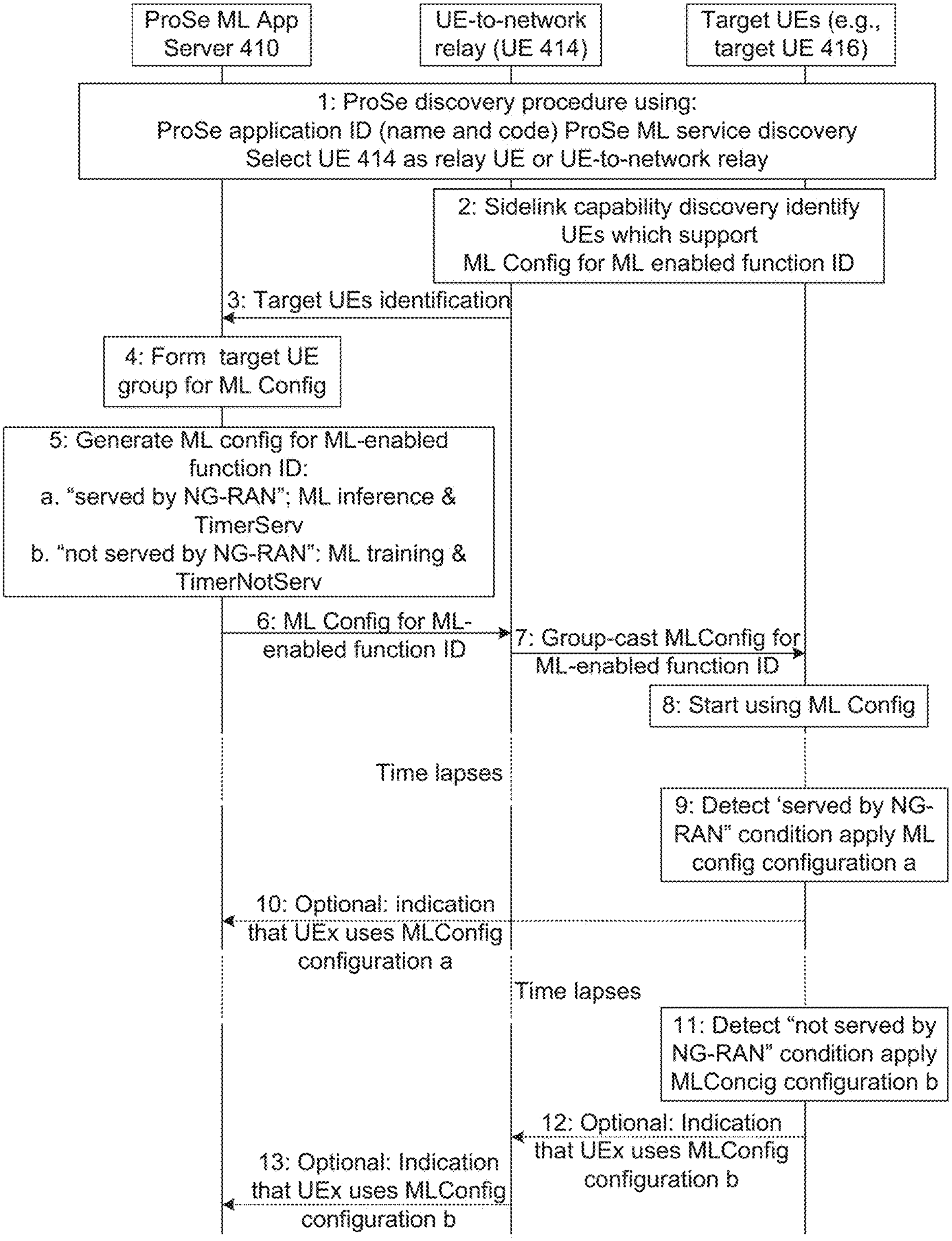
FIG. 5 is a diagram illustrating operation of a network in which a user device or UE acts as a relay UE to relay or forward machine learning (ML) configuration information to one or more other UEs.

FIG. 5 is a diagram illustrating operation of a network in which a user device or UE acts as a relay UE to relay or forward machine learning (ML) configuration information to one or more other UEs. A ProSe ML app server 410, a relay UE 414, and one or more target UEs (such as target UE 416) are shown in FIG. 5. Although not shown in FIG. 5, a serving gNB 412 may relay information, messages and/or signaling between ProSe app server 410 and UE 414 (that is selected as the relay UE). At 1 of FIG. 5, a ProSe discovery procedure is performed between ProSe app server 410 and UEs 414 and 416, e.g., based on a ProSe ML application ID that identifies the ProSe ML app service. The ProSe app server 410 may select and notify the UE 414 (signals and/or messages relayed via gNB 412, FIG. 4) that UE 414 has been selected as a relay UE, e.g., to relay ML configuration information to other UEs. UE 416 (e.g., target UE 416) is in proximity to UE 414 (e.g., relay UE 414).

At 2 of FIG. 5, a SL or ProSe capability exchange and/or capability discovery may be performed between UE 414 (which has been selected as a relay UE) and other UEs (e.g., such as target UE 416). For example, as part of this capability discovery, the UE 414 (e.g., relay UE 414) may determine that UE 416 is in proximity of UE 414 and that UE 416 is capable of sidelink communications and utilizes machine learning (and thus, may be a target for relaying or transmitting the ML configuration information via SL communications). Also, as part of this capability discovery, target UE 416 may receive from UE 414 a notification that UE 414 has a capability to provide machine learning configuration information via sidelink communications to UE 416.

At 3 of FIG. 5, UE 414 sends a message to ProSe ML app server 410 indicating or identifying the one or more target UEs that will receive the relayed ML configuration information to be sent or relayed by UE 414 via SL communications.

At 4 of FIG. 5, ProSe ML app server 410 forms a target UE group (e.g., including one or more target UEs, including target UE 416) for ML configuration via SL communications.

At 5 of FIG. 5, the ProSe ML app server 410 may determine or generate a ML configuration information for a specific ML enabled function ID (identifier), to be provided and/or relayed to one or more UEs. For example, the ML configuration information may include, e.g., a plurality of weights and/or parameters of a machine learning configuration or a machine learning model; a machine learning-enabled feature identifier that identifies for which function, of a plurality of machine learning-enabled functions, the machine learning configuration information is being provided; one or more conditions for a target (receiving) UE (e.g., target UE 416, that receives the ML configuration information relayed from the relay UE 414) that receives the machine learning configuration information to determine a state of the target UE as either served by a network node (e.g., gNB) or not served by a network node; one or more machine learning-enabled function parameters to be used by the target UE if the target UE is in a state of served by a network node; and/or, one or more machine learning-enabled function parameters to be used by the receiving or target UE if target UE is in a state of not served by a network node.

For example, the one or more conditions for the target UE (e.g., UE 416, which is a UE that receives the ML configuration information that is relayed or forwarded by the relay UE 414) that receives the machine learning configuration information to determine a state of the target UE as either served by the network node or not served by the network node may include at least one of: an initial value of a first timer (e.g., TimerNotServ) to be used by the target UE to determine if the target UE is in a state of not served by a network node; an initial value of a second timer (e.g., TimerServ) to be used by the target UE to determine when the target UE is in a state of served by a network node.

Also, for example, the one or more machine learning-enabled function parameters to be used by the target UE if the target UE is in a state of served by a network node may include one or more parameters that instruct the target UE to operate in a first indicated mode of at least one of an inference mode, a training mode, and/or an off mode for the machine learning model when the target UE is in a state of served by the network node; and/or the one or more machine learning-enabled function parameters to be used by the target UE if the target UE is in a state of not served by a network node may include one or more parameters that instruct the target UE to operate in a second indicated mode of at least one of an inference mode, a training mode, and/or an off mode for the machine learning model when the target UE is in a state of not served by a network node, wherein the second indicated mode is different than the first indicated mode. For example, the ML-enabled function parameters may instruct the target UE to operate in an inference mode when the target UE is in a state of served by a network node, and to operate in a training mode or an off mode if the target UE is in a state of not served by a network node, for example.

Thus, for example, at 5 of FIG. 5, the ML configuration received by the relay UE 414 may include multiple ML configurations, e.g., such as: ML configuration a) that indicates a first ML configuration which may include, e.g., ML model parameters or weights, specifies the UE to operate in inference mode if it is in a state of served by a network node, and a timer value for a TimerServ to be used for (or to determine) when the target UE is in a state of served by a network node; and ML configuration b) that indicates a second ML configuration which may include, e.g., ML model parameters or weights, specifies the UE to operate in training mode if it is in a state of not served by a network node, and a timer value for a TimerNotServ to be used for (or to determine) when the target UE is in a state of not served by a network node.

At 6 of FIG. 5, the ProSe ML app server 410 transmits the ML configuration information for the ML-enabled function ID (e.g., for the specific ML function) to the relay UE 414.

At 7 of FIG. 5, the relay UE 414 forwards or relays (transmits) (e.g., unicast, broadcast and/or groupcast transmission) the ML configuration information received from the ProSe ML app server 410 to one or more target UEs, such as to target UE 416.

At 8-13 of FIG. 5, the target UE 416 then uses the received ML configuration(s) information, e.g., in a specified mode, depending on the state of the target UE as either served or not served by a network node. Served by a network node may refer to or may include a case where a target UE is connected or otherwise served by a gNB, while a state of not served by a network node may refer a case where a target UE 416 is not connected or otherwise served by a gNB, for example.

For example, at 8 of FIG. 5, the target UE 416 may begin using the received ML configuration, e.g., the target UE 416 may apply a set of ML mode weights to its ML mode for the indicated ML-enabled function ID, and may begin performing either ML model training or ML model inference, depending on the state of the target UE and/or requirements of the ML configuration.

For example, at 9 of FIG. 5, the target UE 416 may determine that it is in a state of served by a network node (e.g., target UE 416 detects that it is connected to a gNB, sets a timer to the TimerServ to the indicated value, and then the expires while the target UE is still connected to the gNB, causing the target UE 416 to determine that it is in a state of served by a network node. The target UE 416, based on its detected state of served by a network node, applies ML configuration a) to a ML model corresponding to or associated with the ML-enabled function ID (e.g., for a specific ML-enabled function), and begins operating and performing ML model inference, per ML configuration a). At 10 of FIG. 5, target UE 416 may send a notification via relay UE 414 to ProSe ML app server 410 indicating that it is using ML configuration a).

Likewise, at 11 of FIG. 5, the target UE 416 may determine that it is in a state of not served by a network node (e.g., target UE 416 detects that it is not connected to a gNB, sets a timer to the TimerNotServ value, and then the timer expires while the target UE is still not connected to a gNB, causing the target UE 416 to determine that it is in a state of not served by a network node. The target UE 416, based on its detected state of not served by a network node, applies ML configuration b) to a ML model corresponding to or associated with the ML-enabled function ID (e.g., for a specific ML-enabled function), and begins operating and performing ML model training, for example, per the ML configuration b).

At 12-13 of FIG. 5, target UE 416 may send a notification via relay UE 414 to ProSe ML app server 410 indicating that it is using ML configuration b).

The methods of FIGS. 2-3 are further described with respect to FIG. 5. These methods may include a number of details and/or features, which may be further described hereinbelow:

A ProSe ML Service is provided and/or introduced to be used by the UEs to obtain the ProSe service for the new MLConfig provisioning application, from the available ProSe Function and ProSe Application Server. A ProSe ML Application ID (Name and Code) may be indicated and ProSe ML Service are provided to indicate the MLConfig provisioning application type, which UEs may announce/monitor on PC5 signaling. The MLConfig provisioning application may be managed by the ProSe ML Application Server 410 (e.g., see FIGS. 4-5), and the corresponding ProSe application may be assumed to be provisioned in the target UEs. A role of MLConfig (machine learning configuration information) provisioning application is to generate and serve the MLConfig information to various UEs. The MLConfig provisioning application generates the MLConfig information based on requests from an analytics function or a ML orchestrator entities within the 5GS. The generation of the MLConfig can be triggered based on the network detecting that the MLConfig needs to be updated, e.g., based on a detected performance impact.

The MLConfig (machine learning configuration) information may be exchanged via ProSe/PC5-RRC logical interface, and may include, for example, the following configuration elements 1)-4) described hereinbelow:

1) ML configuration information may include ML-enabled feature ID to indicate which UE ML functionality is being (re)configured by the MLConfig message. This ID is assumed to be available at both network and UE side after the UE capability exchange procedures (during network attach, etc.). Alternatively, the ID can be part of the pre-configuration that each new UE is provided during manufacturing. UEs have ML model information, and the network may store this information or may keep track of these ML model information. Network may assign various ML-enabled feature IDs for different RRM features (e.g., different ML-enabled feature IDs to indicate different ML-enabled functions). For example, the network may assign ID1 for link adaptation; ID2 for power control; ID3 for beam selection, where each ID for each ML-enabled feature may have sub-IDs indicating the available ML model IDs. Thus, ML configuration may be specified for a particular combination of ML-enabled feature ID and ML model ID—so use this existing structure to indicate for which ML model this ML configuration may be used.

2) ML configuration information may include definitions for the conditions for target UE to determine the status of itself (the target UE) as either "served" (UE is connected to gNB) or "not served" (UE is not connected to a gNB, where there may be no active connection to a gNB or RAN); Also—served or not served state for ML configuration may also be a reference to whether this UE collects and/or provides ML model training data to gNB. These conditions may be designed specifically for the purpose of the ML-enabled feature in combination with the parameters for target UE when target UE is in a state of served by network node and not served by network node, for example. These conditions may include where the UE is in a state of served or not served which may be based on connected/not connected to gNB, or these states may be more specific to ML model that indicates whether UE collects and provides ML model training information to or from gNB. The definition for conditions for target UEs to determine their state as either served or not served may be based on use of a timer that may be set to one of two different values (TimerNotServ, or TimerServ). TimerNotServ value may start when UE detects out of NG-RAN coverage (not connected to gNB); at the expiration of the timer the UE assumes "not served by NG-RAN" state. The UE cannot collect inputs from ML model from gNB, and cannot provide ML model outputs to gNB, if there is no gNB connection for this UE, and thus may need to use SL for these. And, it may be advantageous to serve this group of UEs via SL, e.g., to communication ML configuration information to this disconnected (or not served) UE via SL from relay UE. TimerServ value may start when UE detects NG-RAN (or gNB) coverage is available (or started when target UE is connected to a gNB, for example). In this case, at the expiration of the timer (based on TimerServ value), the UE assumes "served by NG-RAN" state. The timer initialized to this TimerServ value may be started, for example when UE has a connection to gNB and can receive ML model training date and can provide ML model outputs to gNB after this timer expires. This second group of UEs connected to gNB can receive ML configuration from gNB and/or via SL (SL is presumed to be available as well), for ML operation, communication of ML configuration, training data. These timers may be used by target UEs to determine their state (as served or not served), e.g., to avoid very fast changes in state, e.g., allows a delay to confirm the state of UE as either gnB coverage (e.g., served or connected) or no gNB coverage (e.g., not served or not connected to gNB).

3) ML configuration information may include a ML-enabled feature parameters for UEs when in a state of "served by NG-RAN" or served by network node (e.g., in a state of connected to gNB). For example, UE may be configured to operate in either 'ML inference' mode or 'ML training' mode. These modes may indicate what UE should do (or what mode UE should operate ML model in) after timer is expired when UE is served by gNB. In 'ML inference' mode, the configuration of the TimerServ ensures that the ML-enabled function had sufficient time to acquire sufficient input data in order to provide accurate output; timers above are conditions to enter these ML modes; for served UE, UE is served by gNB, then it uses a ML configuration; these function parameters may indicate that UE should perform inference; or it could indicate that you should perform training. These are examples of ML configuration parameters that may be conveyed to UE. In 'ML training mode', the configuration of the TimerServ ensures that the ML-enabled function had sufficient time to acquire sufficient input data in order to perform its Model training. If UE is connected to gNB, then the timer may be used to require the UE to acquire training data for ML model until timer expires, and then it may perform ML model inference. May perform training until timer expires, and then it may switch to ML model inference after timer expires. These are some examples of how timers may be used to configure UEs and why timers might be useful to configure remote UE ML model operation, for example.

4) Likewise, ML configuration information may include (novel) a ML-enabled feature parameters for UEs when in a state of not served by NG-RAN or not served by network node (e.g., target UE is not connected to gNB). For example, UE may be configured to operate either in 'ML training' mode or just switch off ML operation, as corresponding to the operation configured for "served by NG-RAN". If in 'ML training' mode, UE may store data which is then used to train their model(s). The configuration of the TimerNotServ may ensure that the ML-enabled feature is not immediately reset to training mode after radio connectivity with NG-RAN is lost, and that it starts storing input data while being in the desired state. When UE is not connected to gNB, the UE may receive ML model training data (configuration may have already been received) via SL from any UE; ML model may be switched off completely until you obtain a connection again. If in 'ML-OFF' mode, UE may not start training on loss of connectivity with NG-RAN. This may be useful when UE ML model is already well trained and no further training is required. This tells UE to wait to perform ML model inference until it has connection to gNB; one example ML configuration might be to tell UE that it cannot perform ML model inference if no connection to gNB, this just an examples. Thus, for example, ML configuration information may instruct or inform the target UE to be in one of 3 ML model modes of operation, such as any of the following ML model modes: training, inference or off, depending on connection to gNB and timer states, for example.

The ProSe ML app server 410 may select a UE with support for the ProSe ML Service to act as a relay UE, such as UE 414 in FIGS. 4-5. This selected UE (e.g., relay UE 414) will act as the L2/L3 network relay for the remote/target UEs to which the MLConfig (ML configuration information) needs to be transmitted. The ProSe ML app server 410 may configure the selected UE 414 (relay UE) to discover (or be discoverable by) all UEs nearby which support the ProSe ML Service, using the existing ProSe discovery mechanisms, for example. The selected relay UE (e.g., relay UE 414) should be capable of receiving via Uu (gNB to UE interface) and transmitting via PC5 (UE to UE interface) the ML configuration information to target/remote UEs. In some cases, the relay UE 414 may, but does not need to, support the ML-enabled feature of the target/remote UEs e.g., the beam selection, CSI feedback or positioning solutions. In general, whenever relay UE 414 transfers the ML configuration information without change, the relay UE is not required to support the ML-enabled feature. In other cases, the relay UE 414 may be required to support the same ML-enabled function as the target/remote UEs e.g., in the solutions with ML model learning mechanisms provided across the UEs (see exemplary use-cases below).

A UE-UE sidelink capability exchange procedure may be used to determine if the target UEs support the new MLConfig exchange configured by the NW via ProSe. After the relay UE (e.g., UE 414) has been selected to be a relay UE, the relay UE is triggered or caused to initiate a discovery process (using existing ProSe mechanisms) to find the target UEs nearby or in proximity which support the ML configuration capability on the SL, using the UECapabilityInformationSidelink message, for example. The UECapabilityInformationSidelink message may include a nonCriticalExtension IE (information element), which can be used to convey the new UE capabilities to receive/transmit the ML configuration information via SL (e.g., via PC5-RRC, or via UE-to-UE or SL/ProSe communications). After the relay UE (e.g., UE 414) has discovered one or more target UEs (e.g., UE 416) which support the ML configuration information relay via SL communications, the PC5-RRC logical connection between relay UE 414 and the target UEs (unicast or groupcast) may be used to forward or transmit the ML configuration information.

Figure 6:
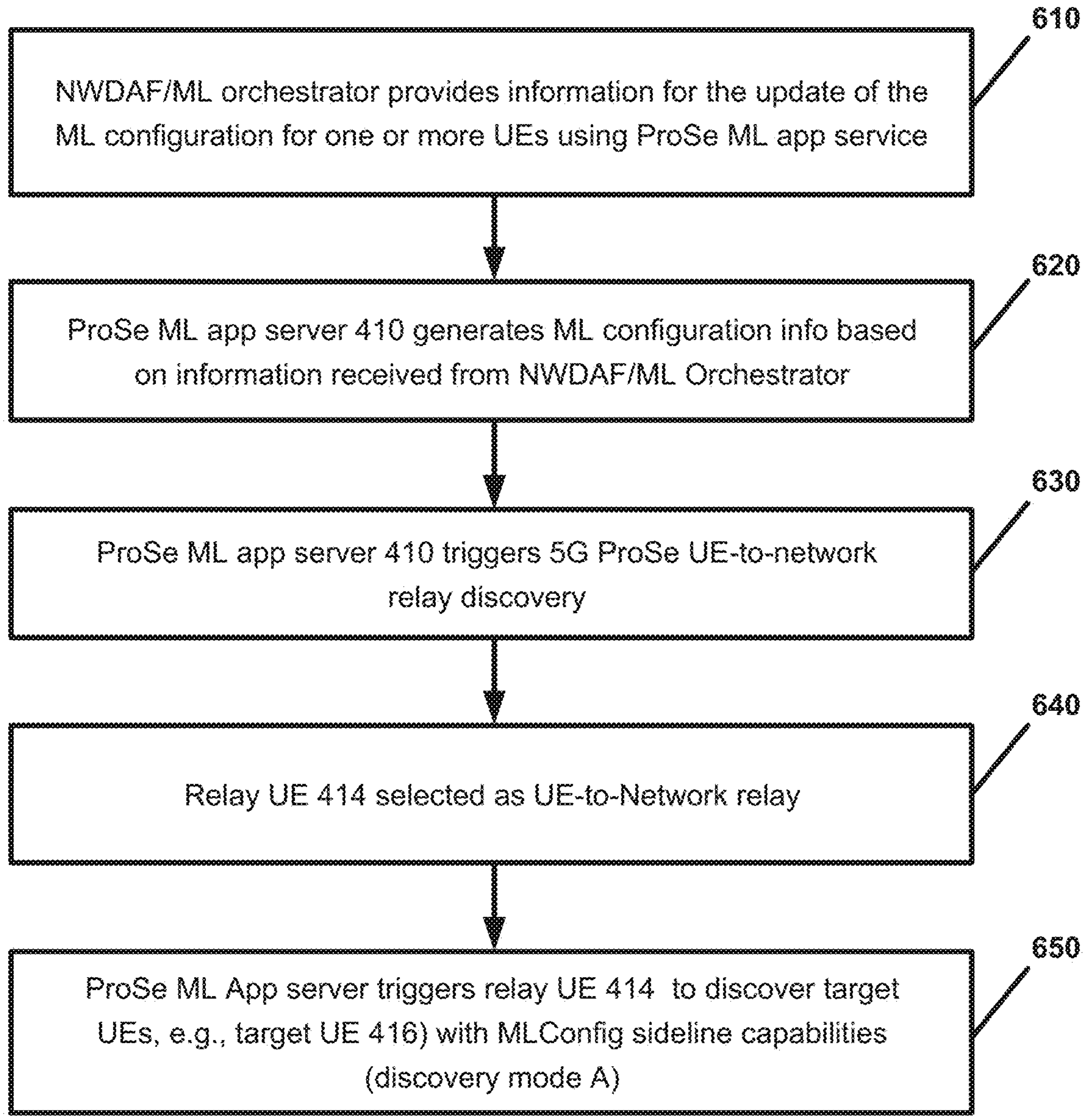
FIG. 6 is a diagram illustrating operation of a ProSe machine learning (ML) application server.

FIG. 6 is a diagram illustrating operation of a ProSe machine learning (ML) application server. At 610, a NWDAF (Network Data Analytics Function) or ML orchestrator function may provide information to the ProSe ML app server 410 for the update of the ML configuration information for one or more UEs using ProSe ML app service. At 620, the ProSe ML app server 410 generates a ML configuration information based on the information received from NWDAF or ML orchestrator. At 630, the ProSe ML app server 410 triggers or causes a 5G ProSe UE-to-network relay discovery in which relay UE 414 is discovered by the ProSe ML app server 410. At 640, the ProSe ML app server 410 selects UE 414 as the relay UE (to be used to relay or forward ML configuration information to one or more target UEs). At 650, the ProSe ML app server triggers relay UE 414 to discover target UEs (e.g., including target UE 416) with the ability to receive ML configuration information via sidelink and that utilize machine learning to perform one or more machine learning-enabled functions.

Figure 7:
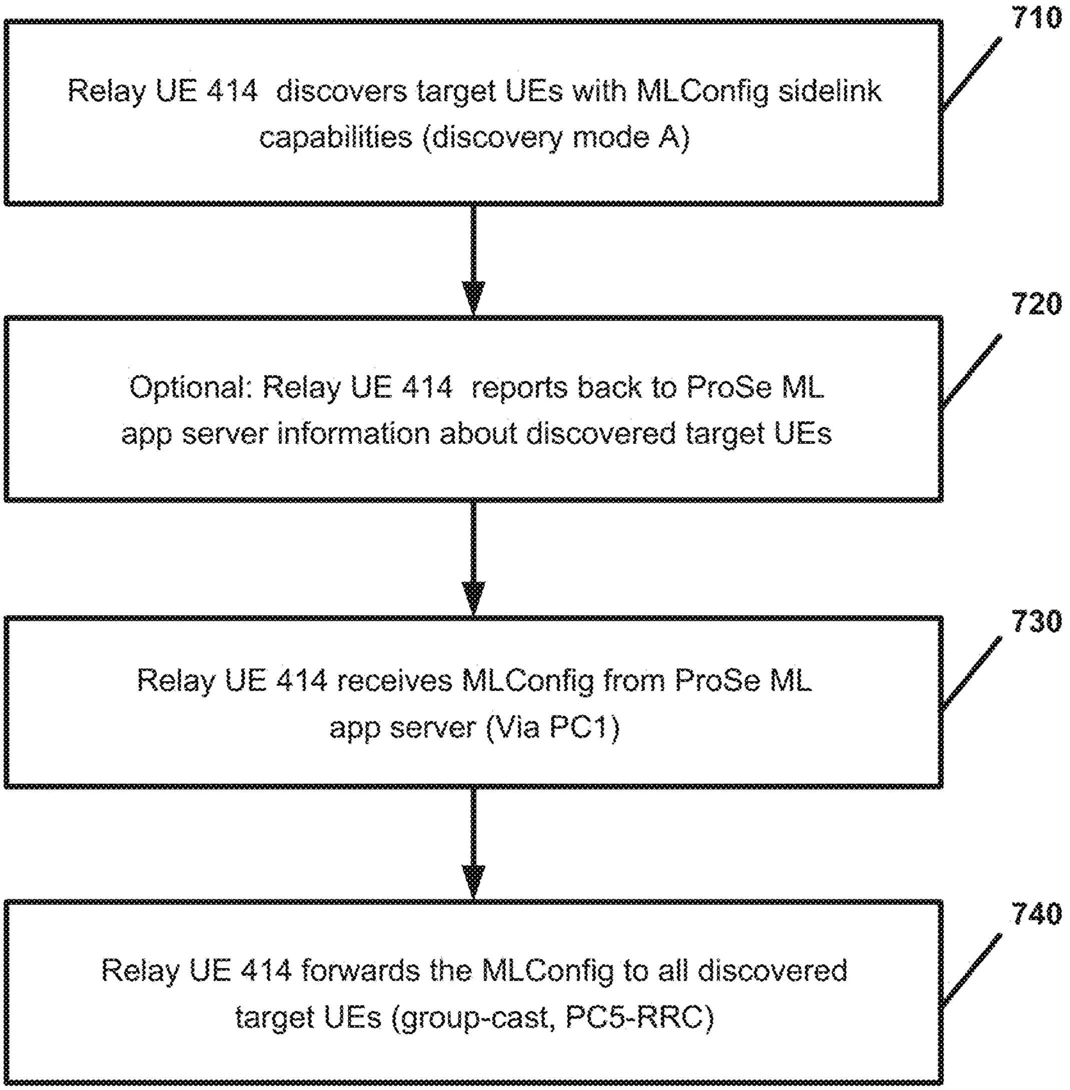
FIG. 7 is a diagram illustrating operation of a relay UE. At 710, relay UE 414 discovers target UEs that have a capability to receive ML configuration information via sidelink communications.

FIG. 7 is a diagram illustrating operation of a relay UE. At 710, relay UE 414 discovers target UEs that have a capability to receive ML configuration information via sidelink communications. At 720, the relay UE 414 may report back to the ProSe ML app server information (e.g., information identifying target UEs) about discovered target UEs. At 730, the relay UE 414 receives the ML configuration information from the ProSe ML app server. At 740, the relay UE 414 forwards the ML configuration information to one or more target UEs.

Figure 8:
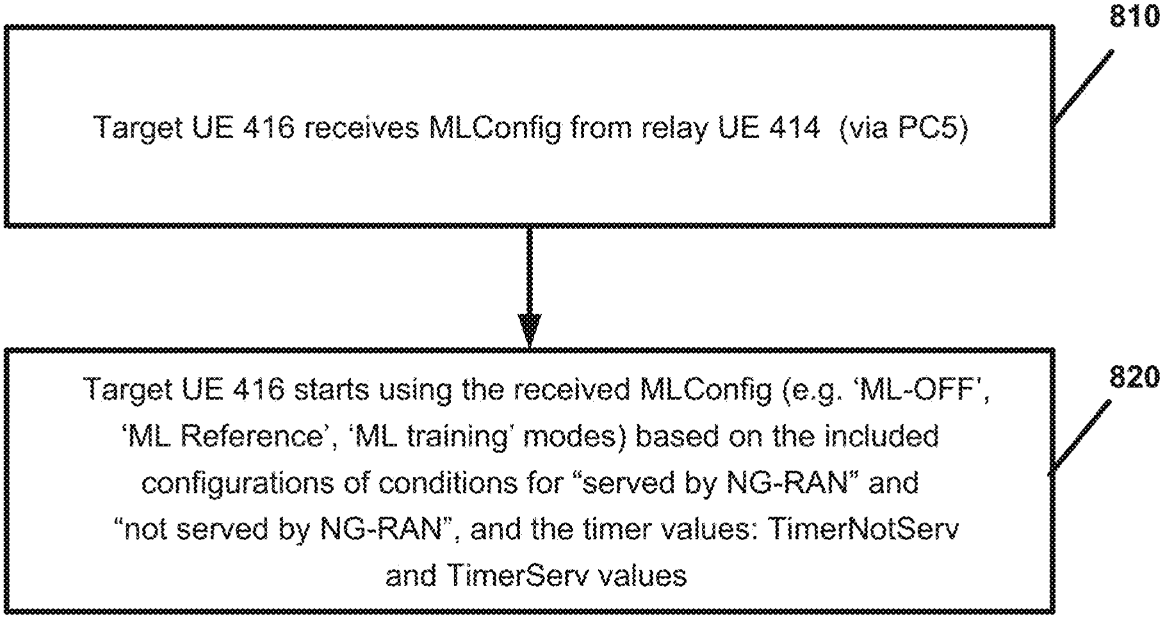
FIG. 8 is a diagram illustrating operation of a target UE that receives machine learning configuration information via sidelink communications.

FIG. 8 is a diagram illustrating operation of a target UE that receives machine learning configuration information via sidelink communications. At 810, target UE 416 receives the machine learning configuration information from a relay UE 414. At 820, the target 416 uses the received ML configuration information based on the included configuration(s), e.g., based on state of UE and conditions and timer values that may be provided as part of the ML configuration information.

Other example features are described below with respect to the methods of FIGS. 2-3. 1) Optional element in MLConfig may include: A ML Path selection policy specific for the ML-enabled feature to indicate which path(s) may be preferred for the ProSe ML Service i.e., PC5 preferred, Uu preferred, or no preference indicated. 2) Alternatively, the MLConfig can be a signaling message which, upon reception at the target UE(s) triggers a selected ML-enabled function operating mode including corresponding configuration parameters (See Example 1 below).

Alternatively, or additionally, the ProSe ML application server 410 may generate two different MLConfig (ML configuration information): one for relay UE 414 and another one for the other target UEs (see Examples 2 and 3 below). This enables the configuration of federated learning/split inference solutions, where the partial models/inference results and/or federation are assumed to be collected at the relay UE 414 (FIGS. 4-5) (UE-to-network relay). In this embodiment, for split inference case (example 3), the MLConfig (ML configuration information) may, for example, include at least the following information: 1) Indication that relay UE 414 performs split inference or relays partial inference results to NW for further processing. In case of NW (network) based split-inference, NW can send results back through UE or directly to UE. 2) Latency information for returning inference results back to UE (e.g., based on computational power of relay UE and link efficiency on relay UE-UE link). For NW based split inference option, the latency information is based on NW computational resources and direct NW-UE link. And, 3) how much maximum processing of split inference can be performed at relay UE (e.g., due to limited energy), which helps the relay UE know how much local processing is required before starting split inference. A similar MLConfig can be included for federated learning (example 2) as well.

Alternatively, or additionally, the ProSe ML application server 410 may generate one MLConfig (machine learning configuration information) which is used as baseline configuration and relay UE 414 can modify it to generate the MLConfig for other target UEs (see Example 1 below). 1) The modification rules, allowed changes, may be included in the baseline MLConfig received by relay UE: 2) The modifications can be performed autonomously by the relay UE 414 when certain radio conditions are met, or when triggered by the NW.

EXAMPLE USE CASES

Figure 9:
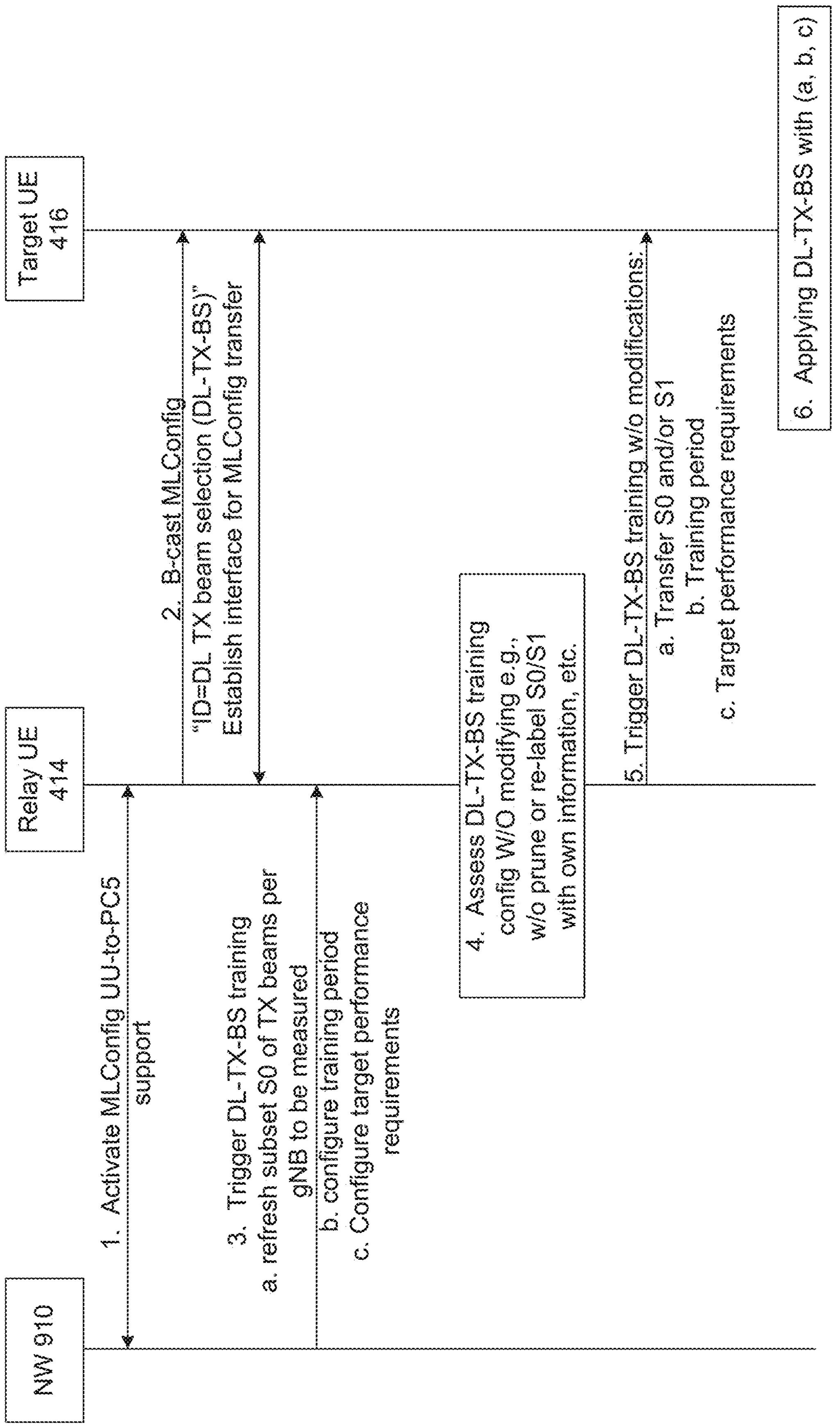
FIG. 9 is a diagram illustrating operation of an example.

Example #1: FIG. 9 is a diagram illustrating operation of Example #1. The target UE ML-enabled feature is based on an UE supervised ML model and is used for beam prediction/selection as shown in FIG. 9. Several UEs in the vicinity of each other are configured to (re)train their model with the same type of input data features, even without using the Uu (only DL beam specific CSI-RS and/or RSRP measurements need to be collected by the UE). When any of the UE uses Uu (to NW) the UE can perform inference for beam prediction/selection. At 1 of FIG. 9, the NW (network entity 910) and relay UE 414 may activate a ML configuration support, and relay UE 414 may receive ML configuration information. At 2, relay UE 414 broadcasts machine learning configuration information with ML-enabled feature ID set to transmit beam selection. At 3, the NW triggers DL transmit beam selection training, and updated ML configuration information is provided to relay UE 414 with respect to beam prediction/selection. At 4, the relay UE 414 may assess SL transmit beam selection training, without modifying the ML configuration information, e.g., w/o pruning or re-labeling S0/S1 with own information. At 5, the relay UE sends a message to target UE 416 to provide updated ML configuration information and trigger DL (downlink) transmit beam selection training without modifications of the ML configuration information received by the relay UE, e.g., including providing beam sets S0 and S1 to be measured, a training period and target performance requirements. At 6, the target UE 416 applies the received ML configuration information to perform ML model training and then inference for DL beam selection, e.g., based on the received ML configuration information.

Example #2: The target UE ML-enabled feature is based on supervised ML model and federated learning technique is used by the NW to collect the partial models from the target UEs. The target UEs in the vicinity of each other are configured to (re)train their model with the same type of input data features. Each target UE transmits their training models to the UE acting as network relay, which can: i) aggregate them and re-distributed the final model; and ii) forward them to the NW, which aggregates them and re-distributes the final model, wither via Uu directly to each UE or via the UE 414 acting as network relay.

Example #3: The target UE ML-enabled feature is based on split/joint inference between UE and NW (or relay UE). The target UEs in vicinity can leverage computational power of other UEs to perform joint/split inference. A particular target UE does not have sufficient power to perform ML inference given its input data. It performs partial inference on its input data (that partially hides identity of input data) and requests NW or relay UE 414 to complete inference, sending back the final results. For example, in a neural network based inference, a part of hidden layers can be processed at target UEs and partial results can be handed over to relay UE 414 for further processing.

ML configuration information may include information such as: an indication that relay UE performs split inference or relays partial inference results to NW for further processing. In case of NW based split-inference, NW can send results back through relay UE or directly to target UE; latency information for returning inference results back to target UE (e.g., based on computational power of a relay UE, and link efficiency on relay UE—target UE link). For NW (network) based split inference option, the latency information is based on NW computational resources and direct NW-UE link; and/or, how much maximum processing of split inference can be performed at relay UE (e.g., due to limited energy), which helps UE know how much local processing is required before starting split inference.

Some Example Advantages

Minimizes RRC signaling overhead on the Uu interface when large number of UEs need to be receive ML-related (re)configuration messages, and allows ML configuration information to more efficiently be distributed among multiple UEs which may or may not be within range of a gNB.

Makes use of existing 5G NR ProSe mechanisms (service provisioning, discovery, etc.) and PC1 and sidelink PC5 RRC interfaces to propagate ML-related configuration to several UEs which use the same ML-enabled function(s).

Enables local adaptation of the ML-related configuration based on information collected at a selected UE-to-network relay (relay UE).

Enables support to configure federated learning solutions among the UE-to-network relay and target UEs.

Some further examples will be provided.

Example 1. A method comprising: receiving (e.g., 210, FIG. 2), by a first user device (e.g., relay UE 414, FIGS. 4, 5 and/or 9) from a network node (e.g., gNB 412, FIG. 4; and/or network (NW) 910, FIG. 9), an indication for the first user device to act as a user device-network relay (e.g., at 1 of FIG. 5, a ProSe (or sidelink) discovery procedure is performed between ProSe app server 410 and UEs 414 and 416, e.g., based on a ProSe ML application ID that identifies the ProSe ML app service. The ProSe app server 410 may select and notify the UE 414 (signals and/or messages relayed via gNB 412, FIG. 4) that UE 414 has been selected as a relay UE, e.g., to relay ML configuration information to other UEs); and in response to the receiving: carrying out (e.g., 220, FIG. 2) a discovery procedure for determining at least one second user device (e.g., target UE 416) that is capable of sidelink communications and utilizes machine learning (e.g., at 1 of FIG. 5, a ProSe discovery procedure is performed between ProSe app server 410 and UEs 414 and 416, e.g., based on a ProSe ML application ID that identifies the ProSe ML app service); receiving (e.g., 230, FIG. 2), by the first user device (e.g., relay UE 414) from the network node (e.g., gNB 412, machine learning configuration information; and transmitting (e.g., 240, FIG. 2), by the first user device (e.g., relay UE 414) to the at least one second user device (e.g., target UE 416, FIGS. 4-5) via sidelink communications, the machine learning configuration information for carrying out a machine learning related operation.

As noted, the machine learning configuration information may include, e.g., at least one of the following: a plurality of weights, bias values, activation functions, convolution parameters, dropout rates, hyperparameters that may be used to configure a ML model for training and/or inference, configuration parameters for the input data pre-processing and output inference post-processing of the ML model, a potential configuration for the non-ML (rule-based) algorithm which may be used as a fall-back mode for the ML-based algorithm or ML-enabled function, and/or other parameters of that may be related to a machine learning configuration or a machine learning model; a machine learning-enabled feature identifier that identifies for which function, of a plurality of machine learning-enabled functions, the machine learning configuration information is being provided; one or more conditions for the at least one second user device that receives the machine learning configuration information to determine a state of the at least one second user device as either served by a network node or not served by a network node; one or more machine learning-enabled function parameters to be used by the at least one second user device if the at least one second user device is in a state of served by a network node; and/or one or more machine learning-enabled function parameters to be used by the at least one second user device if the at least one second user device is in a state of not served by a network node.

Example 2. The method of example 1, further comprising: prior to the transmitting, modifying, by the first user device, the machine learning configuration information. the first user device may modify the machine learning configuration information prior to transmitting the (e.g., modified) machine learning configuration information to the at least one second user device. As noted, the first user device (e.g., relay UE 414) may modify the received machine learning configuration information received from the network node (e.g., gNB 412 and/or ProSe application server 410), and then the first user device (e.g., relay UE 414) may transmit the modified machine learning configuration information to the at least one second user device (e.g., target UE 416). Modifying the machine learning configuration information may include, e.g., modifying, adjusting, changing, altering or updating any aspect or portion of the machine learning configuration information. For example, modifying the machine learning configuration information may include, e.g., one or more of: modifying one or more of the plurality of weights and/or parameters, bias values, activation functions, convolution parameters, dropout rates, hyperparameters used to configure a machine learning model for training and/or inference of a machine learning model or the machine learning configuration information; modifying one or more the configuration parameters for input data pre-processing and output inference post-processing of the machine learning model or the machine learning configuration information; modifying the configuration for the non-machine learning algorithm that may be used as a fall-back mode for the machine learning-based algorithm or machine learning-enabled function; adjusting the validity of the machine learning configuration information, e.g., such as adjusting how long (or time period) the new machine learning configuration information is valid with respect to reception time at the second user device; adjusting (e.g., simplifying or decreasing number of inputs or other parameters) the machine learning configuration information, such as by removing layers, shortening or decreasing input size, etc.

Example 3. The method of example 2, wherein the modifying the machine learning configuration information is performed by the user device based on an indication received by the user device from the network node. For example, relay UE 416 may receive from the gNB 412 or ProSe ML app server 410 a control signal, a command, or an indication of a configuration that instructs or causes the relay UE 414, or allows the relay UE 414, to modify one or more aspects or parameters of the ML configuration information. The relay UE 414 may then forward or transmit the modified ML configuration information to the at least one second user devices (e.g., to the target UEs 416).

Example 4. The method of any of examples 1-3, wherein the carrying out the discovery procedure for determining at least one second user device in proximity of the first user device that is capable of sidelink communications and utilizes machine learning comprises: carrying out a discovery procedure for determining at least one second user device (e.g., at least one target UE 416, FIGS. 4-5) that is capable of using or performing a machine learning-enabled function for which the machine learning configuration information is transmitted or provided, or will be transmitted or provided, by the first user device to the at least one second user device.

Example 5. The method of any of examples 1-4, and further comprising: notifying, by the first user device (relay UE 414, FIGS. 4-5), the at least one second user device (the target UE 416, FIGS. 4-5) that the first user device has a capability to provide machine learning configuration information via sidelink communications. For example, at 2 of FIG. 5, a SL (sidelink) or ProSe capability exchange and/or capability discovery may be performed between relay UE 414 (which has been selected as a relay UE) and other UEs (e.g., such as target UE 416). As part of this capability discovery, target UE 416 may receive from relay UE 414 a notification that relay UE 414 has a capability to provide machine learning configuration information via sidelink communications to target UE 416 (FIG. 5).

Example 6. The method of example 5 wherein the notifying comprises at least one of the following: transmitting, by the first user device (relay UE), an announcement message indicating that the first user device (relay UE 414) has a capability to provide or relay machine learning configuration information via sidelink communications to other user devices (e.g., to target UEs 416); or performing the following: receiving, by the first user device from the at least one second user device, a solicitation message requesting information as to relay capabilities of the first user device; and transmitting, by the first user device to the at least one second user device, a response message indicating that the first user device has the capability to provide machine learning configuration information via sidelink communications to the at least one second user device.

Example 7. The method of example 6 wherein: the announcement message comprises a user device to network relay discovery announcement message; the solicitation message comprises a user device to network relay discovery solicitation message; or the response message comprises a user device to network relay discovery response message.

Example 8. The method of any of examples 1-7, wherein the transmitting the machine learning configuration information comprises at least one of the following: transmitting, by the first user device (e.g., relay UE 414, FIGS. 4-5) to the at least one second user device (e.g., target UE, FIGS. 4-5) via sidelink communications, the machine learning configuration information via unicast communications; or transmitting, by the first user device to the at least one second user device via sidelink communications, the machine learning configuration information via groupcast or broadcast communications.

Example 9. The method of any of examples 1-8, wherein the transmitting the machine learning configuration information comprises: determining whether a number of user devices within an area or a user device density is greater than a threshold; transmitting, by the first user device (e.g., relay UE 414 to the at least one second user device via sidelink communications, the machine learning configuration information via unicast communications if the number of the other user devices within an area or the user device density is not greater than the threshold; and transmitting, by the first user device to the at least one second user device via sidelink communications, the machine learning configuration information via groupcast or broadcast communications if the number of the other user devices within an area or the user device density is greater than the threshold.

Example 10. The method of any of examples 1-9, wherein the machine learning configuration information that is transmitted to the at least one second user device via sidelink communications comprises at least one of the following: a plurality of weights and/or parameters, bias values, activation functions, convolution parameters, dropout rates, hyperparameters to be used to configure a machine learning model for training and/or inference of a machine learning model or the machine learning configuration information; configuration parameters for input data pre-processing and output inference post-processing of the machine learning model or the machine learning configuration information; a configuration for a non-machine learning algorithm that may used as a fall-back mode for the machine learning-based algorithm or machine learning-enabled function; a machine learning-enabled feature identifier that identifies for which function, of a plurality of machine learning-enabled functions, the machine learning configuration information is being provided; one or more conditions for the at least one second user device (e.g., target UE 416, FIGS. 4-5) that receives the machine learning configuration information to determine a state of the at least one second user device (target UE 416) as either served by a network node (e.g., gNB 412, FIG. 4) or not served by a network node; one or more machine learning-enabled function parameters to be used by the at least one second user device if the at least one second user device is in a state of served by a network node; and/or one or more machine learning-enabled function parameters to be used by the at least one second user device if the at least one second user device is in a state of not served by a network node.

Example 11. The method of example 10, wherein the one or more conditions for the at least one second user device (e.g., target UE 416) that receives the machine learning configuration information to determine a state of the at least one second user device as either served by the network node or not served by the network node comprises at least one of: an initial value of a first timer to be used by the at least one second user device to determine if the at least one second user device is in a state of not served by a network node; an initial value of a second timer to be used by the at least one second user device to determine when the second user device is in a state of served by a network node.

Example 12. The method of any of examples 10-11, wherein: the one or more machine learning-enabled function parameters to be used by the at least one second user device (e.g., target UE 416) if the at least one second user device is in a state of served by a network node comprise one or more parameters that instruct the at least one second user device to operate in a first indicated mode of at least one of an inference mode, a training mode, and/or an off mode for the machine learning model when the at least one second user device is in a state of served by the network node; and/or the one or more machine learning-enabled function parameters to be used by the at least one second user device (e.g., target UE 416) if the at least one second user device is in a state of not served by a network node comprise one or more parameters that instruct the at least one second user device to operate in a second indicated mode of at least one of an inference mode, a training mode, and/or an off mode for the machine learning model when the at least one second user device is in a state of not served by a network node, wherein the second indicated mode is different than the first indicated mode.

Example 13. A method wherein the one or more machine learning-enabled function parameters to be used by the at least one second user device (e.g., target UE 416) if the at least one second user device (e.g., target UE 416) is in a state of served by a network node comprise one or more parameters that instruct the at least one second user device to operate in an inference mode for the machine learning model when the at least one second user device is in a state of served by a network node; and/or the one or more machine learning-enabled function parameters to be used by the at least one second user device (e.g., target UE 416) if the at least one second user device (e.g., target UE 416) is in a state of not served by a network node comprise one or more parameters that instruct the at least one second user device to operate in at least one of a training mode or an off mode for the machine learning model when the at least one second user device is in a state of not served by a network node.

Example 14. An apparatus comprising: at least one processor (e.g., 1304, FIG. 10); and at least one memory (e.g., 1306, FIG. 10) including computer program code; the at least one memory and the computer program code configured to, with the at least one processor, cause the apparatus (e.g., 1300, FIG. 10 and/or relay UE 414, FIGS. 4-5) at least to: receive (210, FIG. 2), by a first user device (e.g., relay UE 414) from a network node (e.g., gNB 412 and/or ProSe ML app server 410, FIG. 4), an indication for the first user device to act as a user device-network relay; and in response to the receiving: carry out (220, FIG. 2) a discovery procedure for determining at least one second user device (e.g., target UE 416, FIGS. 4-5) that is capable of sidelink communications and utilizes machine learning; receive (e.g., 230, FIG. 2), by the first user device (e.g., relay UE 414) from the network node, machine learning configuration information; and transmit, by the first user device to the at least one second user device via sidelink communications, the machine learning configuration information for carrying out a machine learning related operation.

Example 15. An apparatus comprising: at least one processor; and at least one memory including computer program code; the at least one memory and the computer program code configured to, with the at least one processor, cause the apparatus at least to perform the method of any of examples 1-13.

Example 16. A non-transitory computer-readable storage medium (e.g., 1306, FIG. 10) comprising instructions stored thereon that, when executed by at least one processor (e.g., 1304, FIG. 10), are configured to cause a computing system (e.g., 1300, FIG. 10, and/or relay UE 414, FIGS. 4-5) to perform the method of any of examples 1-13.

Example 17. An apparatus comprising means (e.g., processor 1304, memory 1306, RF or wireless transceiver 1302A, FIG. 10) for performing the method of any of examples 1-13.

Example 18. A method comprising: receiving (310, FIG. 3), by a second user device (e.g., target UE 416, FIGS. 4-5) from a first user device (e.g., relay UE 414, FIGS. 4-5), a notification that the first user device (e.g., relay UE 414) has a capability to provide machine learning configuration information via sidelink communications, wherein the second user device (e.g., target UE 416) utilizes machine learning to perform one or more machine learning related operations; receiving (e.g., 320, FIG. 3), by the second user device (e.g., target UE 416) from the first user device (e.g., relay UE 414) via sidelink communications, the machine learning configuration information; and using (e.g., 330, FIG. 3), by the second user device (e.g., target UE 416), the received machine learning configuration information to configure and/or operate a machine learning model at the second user device to carry out a machine learning related operation.

Example 19. The method of example 18, wherein the machine learning configuration received by the second user device has been modified by the first user device before being received the second user device. As noted, the first user device (e.g., relay UE 414) may modify the received machine learning configuration information received from the network node (e.g., gNB 412 and/or ProSe application server 410), and then the first user device (e.g., relay UE 414) may transmit the modified machine learning configuration information to the at least one second user device (e.g., to the target UE 416). Modifying the machine learning configuration information may include, e.g., modifying, adjusting, changing, altering or updating any aspect or portion of the machine learning configuration information. For example, modifying the machine learning configuration information may include, e.g., one or more of: modifying one or more of the plurality of weights and/or parameters, bias values, activation functions, convolution parameters, dropout rates, hyperparameters used to configure a machine learning model for training and/or inference of a machine learning model or the machine learning configuration information; modifying one or more the configuration parameters for input data pre-processing and output inference post-processing of the machine learning model or the machine learning configuration information; modifying the configuration for the non-machine learning algorithm that may be used as a fall-back mode for the machine learning-based algorithm or machine learning-enabled function; adjusting the validity of the machine learning configuration information, e.g., such as adjusting how long (or time period) the new machine learning configuration information is valid with respect to reception time at the second user device; adjusting (e.g., simplifying or decreasing number of inputs or other parameters) the machine learning configuration information, such as by removing layers, shortening or decreasing input size, etc.

Example 20. The method of any of examples 18-19, wherein the receiving a notification comprises at least one of: receiving, by the second user device, an announcement message indicating that the first user device has a capability to provide or relay machine learning configuration information via sidelink communications to the second user device; or performing the following: transmitting, by the second user device to the first user device, a solicitation message requesting information as to relay capabilities of the first user device; and receiving, by the second user device from the first user device, a response message indicating that the first user device has the capability to provide machine learning configuration information via sidelink communications to the at least one second user device.

Example 21. The method of example 20 wherein: the announcement message comprises a user device to network relay discovery announcement message; the solicitation message comprises a user device to network relay discovery solicitation message; or the response message comprises a user device to network relay discovery response message.

Example 22. The method of any of examples 18-21, wherein the receiving the machine learning configuration information comprises at least one of the following: receiving, by the second user device from the first user device via sidelink communications, the machine learning configuration information via unicast communications; or receiving, by the second user device from the first user device via sidelink communications, the machine learning configuration information via groupcast or broadcast communications.

Example 23. The method of any of examples 18-22, wherein the machine learning configuration information comprises at least one of the following: a plurality of weights and/or parameters, bias values, activation functions, convolution parameters, dropout rates, hyperparameters to be used to configure a machine learning model for training and/or inference of a machine learning model or the machine learning configuration information; configuration parameters for input data pre-processing and output inference post-processing of the machine learning model or the machine learning configuration information; a configuration for a non-machine learning algorithm that may used as a fall-back mode for the machine learning-based algorithm or machine learning-enabled function; a machine learning-enabled feature identifier that identifies for which function, of a plurality of machine learning-enabled functions, the machine learning configuration information is being provided; one or more conditions for the second user device that receives the machine learning configuration information to determine a state of the second user device as either served by a network node or not served by a network node; one or more machine learning-enabled function parameters to be used by the second user device if the second user device is in a state of served by a network node; and/or one or more machine learning-enabled function parameters to be used by the second user device if the second user device is in a state of not served by a network node.

Example 24. The method of example 23, wherein the one or more conditions for the second user device (e.g., target UE 416, FIGS. 4-5) that receives the machine learning configuration information to determine a state of the second user device as either served by the network node or not served by the network node comprises at least one of: an initial value of a first timer to be used by the second user device to determine if the second user device is in a state of not served by a network node; an initial value of a second timer to be used by the second user device to determine when the second user device is in a state of served by a network node.

Example 25. The method of any of examples 23-24, wherein: the one or more machine learning-enabled function parameters to be used by the second user device (e.g., target UE 416) if the second user device is in a state of served by a network node comprise one or more parameters that instruct the second user device to operate in a first indicated mode of at least one of an inference mode, a training mode, and/or an off mode for the machine learning model when the second user device is in a state of served by the network node; and/or the one or more machine learning-enabled function parameters to be used by the second user device if the second user device is in a state of not served by a network node comprise one or more parameters that instruct the second user device to operate in a second indicated mode of at least one of an inference mode, a training mode, and/or an off mode for the machine learning model when the at least one second user device is in a state of not served by a network node, wherein the second indicated mode is different than the first indicated mode.

Example 26. The method of any of examples 23-25, wherein: the one or more machine learning-enabled function parameters to be used by the second user device (e.g., target UE 416, FIGS. 4-5) if the at least one second user device is in a state of served by a network node (e.g., gNB 412, FIG. 4) comprise one or more parameters that instruct the second user device to operate in an inference mode for the machine learning model when the second user device is in a state of served by a network node; and/or the one or more machine learning-enabled function parameters to be used by the second user device if the second user device is in a state of not served by a network node comprise one or more parameters that instruct the second user device to operate in at least one of a training mode or an off mode for the machine learning model when the second user device is in a state of not served by a network node.

Example 27. An apparatus comprising: at least one processor (e.g., 1304, FIG. 10); and at least one memory (e.g., 1306, FIG. 10) including computer program code; the at least one memory and the computer program code configured to, with the at least one processor, cause the apparatus (e.g., 1300, FIG. 10 and/or target UE 416, FIGS. 4-5) at least to: receive, by a second user device (e.g., target UE 416) from a first user device (e.g., relay UE 414, FIGS. 4-5) that is in proximity to the second user device, a notification that the first user device has a capability to provide machine learning configuration information via sidelink communications, wherein the second user device utilizes machine learning to perform one or more machine learning related operations; receive, by the second user device from the first user device via sidelink communications, the machine learning configuration information; and use, by the second user device, the received machine learning configuration information to configure and/or operate a machine learning model at the second user device to carry out a machine learning related operation.

28. An apparatus (e.g., 1300, FIG. 10 and/or target UE 416) comprising: at least one processor (e.g., 1304, FIG. 10); and at least one memory (e.g., 1306, FIG. 10) including computer program code; the at least one memory and the computer program code configured to, with the at least one processor, cause the apparatus (e.g., 1300, FIG. 10 and/or target UE 416) at least to: perform the method of any of examples 18-26.

Example 29. A non-transitory computer-readable storage medium (e.g., memory 1306, FIG. 10) comprising instructions stored thereon that, when executed by at least one processor (e.g., processor 1304, FIG. 10), are configured to cause a computing system (e.g., 1300, FIG. 10, and/or target UE 416) to perform the method of any of examples 18-26.

Example 30. An apparatus comprising means (e.g., processor 1304, memory 1306, and/or RF or wireless transceiver 1302A, FIG. 10) for performing the method of any of examples 18-26.

Figure 10:
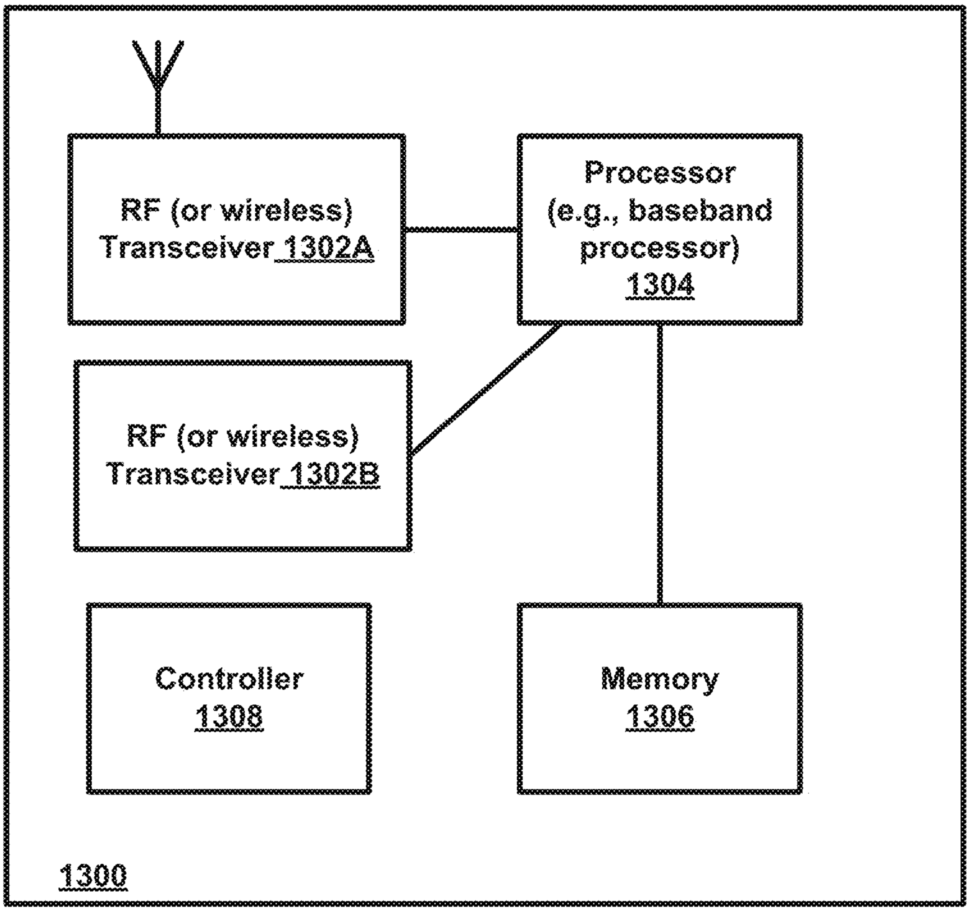
FIG. 10 is a block diagram of a wireless station or node (e.g., network node, user node or UE, relay node, or other node).

FIG. 10 is a block diagram of a wireless station or node (e.g., UE, user device, AP, BS, eNB, gNB, RAN node, network node, TRP, or other node) 1300 according to an example embodiment. The wireless station 1300 may include, for example, one or more (e.g., two as shown in FIG. 10) RF (radio frequency) or wireless transceivers 1302A, 1302B, where each wireless transceiver includes a transmitter to transmit signals and a receiver to receive signals. The wireless station also includes a processor or control unit/entity (controller) 1304 to execute instructions or software and control transmission and receptions of signals, and a memory 1306 to store data and/or instructions.

Processor 1304 may also make decisions or determinations, generate frames, packets or messages for transmission, decode received frames or messages for further processing, and other tasks or functions described herein. Processor 1304, which may be a baseband processor, for example, may generate messages, packets, frames or other signals for transmission via wireless transceiver 1302 (1302A or 1302B). Processor 1304 may control transmission of signals or messages over a wireless network, and may control the reception of signals or messages, etc., via a wireless network (e.g., after being down-converted by wireless transceiver 1302, for example). Processor 1304 may be programmable and capable of executing software or other instructions stored in memory or on other computer media to perform the various tasks and functions described above, such as one or more of the tasks or methods described above. Processor 1304 may be (or may include), for example, hardware, programmable logic, a programmable processor that executes software or firmware, and/or any combination of these. Using other terminology, processor 1304 and transceiver 1302 together may be considered as a wireless transmitter/receiver system, for example.

In addition, referring to FIG. 10, a controller (or processor) 1308 may execute software and instructions, and may provide overall control for the station 1300, and may provide control for other systems not shown in FIG. 10, such as controlling input/output devices (e.g., display, keypad), and/or may execute software for one or more applications that may be provided on wireless station 1300, such as, for example, an email program, audio/video applications, a word processor, a Voice over IP application, or other application or software.

In addition, a storage medium may be provided that includes stored instructions, which when executed by a controller or processor may result in the processor 1304, or other controller or processor, performing one or more of the functions or tasks described above.

According to another example embodiment, RF or wireless transceiver(s) 1302A/1302B may receive signals or data and/or transmit or send signals or data. Processor 1304 (and possibly transceivers 1302A/1302B) may control the RF or wireless transceiver 1302A or 1302B to receive, send, broadcast or transmit signals or data.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method performed by a first user device, the method comprising:

receiving, from a network node, a first indication that the first user device is selected to act as a user device-network relay to relay Machine Learning (ML) configuration information, wherein the network node comprises Proximity Services (ProSe) application server, and wherein the first indication comprises a ProSe ML application identifier;

in response to receiving the first indication:

activating an ML configuration support; and performing a sidelink discovery procedure with a plurality of user devices in proximity to the first user device for determining at least one second user device from the plurality of user devices that:

is capable of sidelink communications, utilizes an ML model to perform one or more ML-related operations, and is capable of performing an ML-enabled function for which the first user device transmits the ML configuration information;

transmitting, to the at least one second user device, a notification indicating that the first user device has a capability to provide the ML configuration information via sidelink communications, the transmitting of the notification:

transmitting an announcement message, wherein the announcement message comprises a user device to network relay discovery announcement message; and receiving, from the at least one second user device, a solicitation message requesting information about relay capabilities of the first user device, and in response to the solicitation message, transmitting, to the at least one second user device, a response message indicating the capability of the first user device to provide the ML configuration information;

reporting, to the network node, an identification of one or more target devices including the at least one second user device capable to receive the ML configuration information;

receiving, from the network node, the ML configuration information and a network-configured threshold value, wherein the ML configuration information comprises:

a plurality of parameters to configure the ML model of the at least one second user device, the plurality of parameters comprising:

a plurality of weights, a plurality of bias values, a plurality of activation functions, a plurality of convolution parameters, a plurality of dropout rates, and a plurality of hyperparameters;

a plurality of configuration parameters for input data pre-processing and output inference post-processing;

a configuration for a non-machine learning fallback algorithm;

one or more timers, including an initial value for at least one of the one or more timers, for determining a state of the at least one second user device as one of:

served by a network node, or not served by the network node;

a first set of ML-enabled function parameters instructing operation in a first indicated ML operational mode when in the state of being served by the network node; and a second set of ML-enabled function parameters instructing operation in a second indicated ML operational mode when in the state of not being served by the network node, wherein the second indicated ML operational mode is different from the first indicated ML operational mode;

receiving, from the network node, a second indication to modify the ML configuration information;

in response to receiving the second indication, modifying the received ML configuration information to generate modified ML configuration information, the modifying comprising:

modifying one or more of the plurality of weights or the plurality of hyperparameters of the ML model, modifying the input data pre-processing or the output inference post-processing configuration parameters, modifying a fallback configuration, adjusting a validity time period of the ML configuration information, or adjusting a complexity of the ML configuration information by removing one or more layers of the ML model or decreasing an input size of the input data for the ML model; and transmitting, to the at least one second user device via sidelink communications, the modified ML configuration information for carrying out an ML-related operation, the transmitting comprising:

determining a user device density of the one or more target devices;

comparing the determined user device density to the network-configured threshold value to generate a comparison result;

in response to the comparison result indicating the determined user device density is less than the network-configured threshold value, transmitting the modified ML configuration information to the at least one second user device via unicast communications; and in response to the comparison result indicating the determined user device density is greater than the network-configured threshold value, transmitting the modified ML configuration information to the one or more target devices via groupcast or broadcast communications;

receiving, from the at least one second user device subsequent to the transmitting of the modified ML configuration information, a status notification indicating which of the first indicated ML operational mode or the second indicated ML operational mode is being used by the at least one second user device; and in response to receiving the status notification, relaying the status notification to the network node.

2. The method of claim 1, wherein the first indication is triggered based on information provided to the network node by a Network Data Analytics Function (NWDAF), or the ProSe ML application server.

3. The method of claim 1, wherein the ML-related operation is a split inference operation, wherein the ML configuration information instructs the at least one second user device to perform a partial inference and transmit partial inference results to the first user device, the method further comprising:

receiving, from the at least one second user device, the partial inference results; and processing the partial inference results by at least one of completing the split inference operation or forwarding the partial inference results to the network node.

4. The method of claim 1, wherein the ML-related operation is a federated learning operation, wherein the ML configuration information instructs the at least one second user device to train a local ML model and transmit a resulting partial model to the first user device, the method further comprising:

receiving, from the at least one second user device, the partial model; and processing the partial model by at least one of aggregating the partial model with one or more other partial models or forwarding the partial model to the network node for aggregation.

5. A first user device comprising:

at least one processor; and at least one memory including computer program code;

the at least one memory and the computer program code configured to, with the at least one processor, cause the first user device at least to:

receive, from a network node, a first indication that the first user device is selected to act as a user device-network relay to relay Machine Learning (ML) configuration information, wherein the network node comprises Proximity Services (ProSe) application server, and wherein the first indication comprises a ProSe ML application identifier;

in response to receiving the first indication:

activate an ML configuration support; and perform a sidelink discovery procedure with a plurality of user devices in proximity to the first user device for determining at least one second user device from the plurality of user devices that:

is capable of sidelink communications, utilizes an ML model to perform one or more ML-related operations, and is capable of performing a ML-enabled function for which the first user device transmits the ML configuration information;

transmit, to the at least one second user device, a notification indicating that the first user device has a capability to provide the ML configuration information via sidelink communications, the transmitting of the notification comprising at least one of:

transmitting an announcement message, wherein the announcement message comprises a user device to network relay discovery announcement message; or receiving, from the at least one second user device, a solicitation message requesting information about relay capabilities of the first user device, and in response to the solicitation message, transmitting, to the at least one second user device, a response message indicating the capability of the first user device to provide the ML configuration information;

report, to the network node, an identification of one or more target devices including the at least one second user device capable to receive the relay ML configuration information;

receive, from the network node, the ML configuration information and a network-configured threshold value, wherein the ML configuration information comprises:

a plurality of parameters to configure the ML model of the at least one second user device, the plurality of parameters comprising:

a plurality of weights, a plurality of bias values, a plurality of activation functions, a plurality of convolution parameters, a plurality of dropout rates, and a plurality of hyperparameters;

configuration parameters for input data pre-processing and output inference post-processing;

a configuration for a non-machine learning fallback algorithm;

one or more timers, including an initial value for at least one of the one or more timers, for determining a state of the at least one second user device as one of:

served by a network node, or not served by the network node;

a first set of ML-enabled function parameters instructing operation in a first indicated ML operational mode when in the state of being served by the network node; and a second set of ML-enabled function parameters instructing operation in a second indicated ML operational mode when in the state of not being served by the network node, wherein the second indicated ML operational mode is different from the first indicated ML operational mode;

receive, from the network node, a second indication to modify the ML configuration information;

in response to receiving the second indication, modify the received ML configuration information to generate modified ML configuration information, the modifying comprising:

modifying one or more of the plurality of weights or the plurality of hyperparameters of the ML model;

modifying the input data pre-processing or the output inference post-processing configuration parameters, modifying a fallback configuration, adjusting a validity time period of the ML configuration information, and adjusting a complexity of the ML configuration information by removing one or more layers of the ML model or decreasing an input size of the input data for the ML model; and transmit, to the at least one second user device via sidelink communications, the modified ML configuration information for carrying out ML-related operation, the transmit comprising:

determining a user device density of the one or more target devices;

comparing the determined user device density to the network-configured threshold value to generate a comparison result;

in response to the comparison result indicating the determined user device density is less than the network-configured threshold value, transmitting the modified ML configuration information to the at least one second user device via unicast communications; and in response to the comparison result indicating the determined user device density is greater than the network-configured threshold value, transmitting the modified ML configuration information to the one or more target devices via groupcast or broadcast communications;

receive, from the at least one second user device subsequent to the transmitting of the modified ML configuration information, a status notification indicating which of the first indicated ML operational mode or the second indicated ML operational mode is being used by the at least one second user device; and in response to receiving the status notification, relay the status notification to the network node.

6. A method performed by a second user device, the method comprising:

receiving, from a first user device, a notification that the first user device has a capability to provide machine learning (ML) configuration information via sidelink communications, wherein the second user device utilizes an ML model to perform one or more ML-related operations, and wherein the notification is received by performing:

receiving, from the first user device, an announcement message comprising the notification; and transmitting, to the first user device via sidelink communications, a solicitation message requesting information about relay capabilities of the first user device, and in response to the solicitation message, receiving, from the first user device, a response message comprising the notification;

receiving, from the first user device, the ML configuration information via one of unicast communications or groupcast or broadcast communications, wherein the ML configuration information has been modified by the first user device before being received by the second user device, and wherein the ML configuration information comprises:

a plurality of parameters to configure the ML model of the second user device, the plurality of parameters comprising:

a plurality of weights, a plurality of bias values, a plurality of activation functions, a plurality of convolution parameters, a plurality of dropout rates, and a plurality of hyperparameters;

configuration parameters for input data pre-processing and output inference post-processing;

a configuration for a non-machine learning fallback algorithm;

one or more timers, including an initial value for at least one of the one or more timers, for determining a state of the second user device as one of:

served by a network node, or not served by the network node;

a first set of ML-enabled function parameters instructing operation in a first indicated ML operational mode when in the state of being served by the network node; and a second set of ML-enabled function parameters instructing operation in a second indicated ML operational mode when in the state of not being served by the network node, wherein the second indicated ML operational mode is different from the first indicated ML operational mode;

using, by the second user device, the received ML configuration information to configure and operate the ML model at the second user device to carry out an ML-related operation, wherein using the received ML configuration comprises:

based on the one or more timers, determining the state of the second user device as either served by the network node or not served by the network node; and selectively operating the ML model in one of:

a first mode when the second user device is in the state of being served by the network node by using the first set of ML-enabled function parameters; or a second mode different from the first mode when the second user device is in the state of not being served by the network node by using the second set of ML-enabled function parameters, wherein the first mode and the second mode are selected from a group consisting of an inference mode, a training mode, and an off mode; and sending, to the network node via the first user device, a notification indicating the operating mode of the ML model of the second user device.

7. A second user device comprising:

at least one processor; and at least one memory including computer program code;

the at least one memory and the computer program code configured to, with the at least one processor, cause the second user device at least to:

receive, from a first user device, a notification that the first user device has a capability to provide machine learning (ML) configuration information via sidelink communications, wherein the second user device utilizes an ML model to perform one or more ML-related operations, and wherein the notification is received by performing:

receiving, from the first user device, an announcement message comprising the notification; or transmitting, to the first user device via sidelink communications, a solicitation message requesting information about relay capabilities of the first user device, and in response to the solicitation message, receive, from the first user device, a response message comprising the notification;

receive, from the first user device, the ML configuration information via one of unicast communications or groupcast or broadcast communications, wherein the ML configuration information has been modified by the first user device before being received by the second user device, and wherein the ML configuration information comprises:

a plurality of parameters to configure the ML model of the second user device, the plurality of parameters comprising:

a plurality of weights, a plurality of bias values, a plurality of activation functions, a plurality of convolution parameters, a plurality of dropout rates, and a plurality of hyperparameters;

configuration parameters for input data pre-processing and output inference post-processing;

a configuration for a non-machine learning fallback algorithm;

one or more timers, including an initial value for at least one of the one or more timers, for determining a state of the second user device as one of:

served by a network node, or not served by the network node;

a first set of ML-enabled function parameters instructing operation in a first indicated ML operational mode when in the state of being served by the network node; and a second set of ML-enabled function parameters instructing operation in a second indicated ML operational mode when in the state of not being served by the network node, wherein the second indicated ML operational mode is different from the first indicated ML operational mode;

use, by the second user device, the received ML configuration information to configure and operate the ML model at the second user device to carry out an ML-related operation, wherein using the received ML configuration comprises:

based on the one or more timers, determining the state of the second user device as either served by the network node or not served by the network node; and selectively operating the ML model in one of:

a first mode when the second user device is in the state of being served by the network node by using the first set of ML-enabled function parameters; or a second mode different from the first mode when the second user device is in the state of not being served by the network node by using the second set of ML-enabled function parameters, wherein the first mode and the second mode are selected from a group consisting of an inference mode, a training mode, and an off mode; and sending, to the network node via the first user device, a notification indicating the operating mode of the ML model of the second user device.

* * * * *